US009756167B2

(12) United States Patent
Izutsu

(10) Patent No.: US 9,756,167 B2
(45) Date of Patent: Sep. 5, 2017

(54) MOBILE INFORMATION PROCESSING APPARATUS

(71) Applicant: DAP REALIZE INC., Tokyo (JP)

(72) Inventor: Masahiro Izutsu, Tokyo (JP)

(73) Assignee: DAP REALIZE INC., Tokyo (JP)

( * ) Notice: Subject to any disclaimer, the term of this patent is extended or adjusted under 35 U.S.C. 154(b) by 0 days.

(21) Appl. No.: 15/210,113

(22) Filed: Jul. 14, 2016

(65) Prior Publication Data
US 2016/0352882 A1 Dec. 1, 2016

Related U.S. Application Data

(63) Continuation of application No. 13/459,646, filed on Apr. 30, 2012, now Pat. No. 9,420,085, which is a
(Continued)

(30) Foreign Application Priority Data

Dec. 24, 2004 (JP) .................................. 2004-372558
Jul. 28, 2005 (JP) .................................. 2005-218159

(51) Int. Cl.
*G06F 13/14* (2006.01)
*H04M 1/725* (2006.01)
(Continued)

(52) U.S. Cl.
CPC ........ H04M 1/7253 (2013.01); G06F 3/1438 (2013.01); H04L 67/02 (2013.01);
(Continued)

(58) Field of Classification Search
CPC ........ G06F 13/00; G06F 13/1438; G06F 3/14; H05K 7/10; G01C 21/00; H04B 1/38
(Continued)

(56) References Cited

U.S. PATENT DOCUMENTS 5,528,740 A * 6/1996 Hill ...................... G06T 3/4023
345/428
5,610,630 A * 3/1997 Nakamura ............ G06F 3/1423
345/539
(Continued)

FOREIGN PATENT DOCUMENTS

EP       1 383 027       1/2004
GB       2 369 959       6/2002
(Continued)

OTHER PUBLICATIONS

English translation of the International Preliminary Report on Patentability issued in International Application No. PCT/JP2005/022833.
(Continued)

*Primary Examiner* — Christopher Shin
(74) *Attorney, Agent, or Firm* — Wenderoth, Lind & Ponack, L.L.P.

(57) ABSTRACT

A mobile information communication apparatus includes a data processing device for sending plotting command/data to a display control device that controls the pixels of a display panel belonging to the mobile information communication apparatus. An interface device is provided which receives the plotting command/data generated by the data processing device and sends, based on plotting command/data, an external display signal to the external display device. The data processing device and the interface device are configured to send, from the interface device, a higher-resolution external display signal.

2 Claims, 12 Drawing Sheets

Related U.S. Application Data continuation of application No. 13/082,735, filed on Apr. 8, 2011, now Pat. No. 8,190,799, which is a continuation of application No. 12/588,255, filed on Oct. 8, 2009, now Pat. No. 7,949,804, which is a continuation of application No. 11/793,765, filed as application No. PCT/JP2005/022833 on Dec. 13, 2005, now Pat. No. 7,624,210.

(51) Int. Cl.
| | |
|---|---|
| *G06F 3/14* | (2006.01) |
| *H04L 29/08* | (2006.01) |
| *H04M 1/02* | (2006.01) |
| *G06F 13/00* | (2006.01) |
| *H04M 1/737* | (2006.01) |

(52) U.S. Cl.
CPC ..... *H04M 1/0266* (2013.01); *H04M 1/72527* (2013.01); *H04M 1/72544* (2013.01); *H04M 1/737* (2013.01); *H04M 2201/38* (2013.01)

(58) Field of Classification Search
USPC ...... 710/62–74, 303; 709/202–206; 725/118; 701/200; 455/552.1, 553.1, 554.1, 554.2, 455/556.1, 556.2, 557
See application file for complete search history.

(56) References Cited

U.S. PATENT DOCUMENTS

| | | | | |
|---|---|---|---|---|
| 6,101,620 | A * | 8/2000 | Ranganathan | G11C 29/20 345/519 |
| 6,131,042 | A * | 10/2000 | Lee | H04M 1/6083 455/345 |
| 6,184,935 | B1 * | 2/2001 | Iaquinto | G06T 1/60 348/441 |
| 6,236,868 | B1 * | 5/2001 | Lygas | H04B 1/3877 340/686.1 |
| 6,253,069 | B1 | 6/2001 | Mankovitz | |
| 6,321,346 | B1 | 11/2001 | Murotani et al. | |
| 6,525,768 | B2 | 2/2003 | Obradovich | |
| 6,529,824 | B1 | 3/2003 | Obradovich | |
| 6,554,437 | B2 | 4/2003 | von Glasow | |
| 6,781,635 | B1 | 8/2004 | Takeda | |
| 7,053,866 | B1 | 5/2006 | Mimran | |
| 7,062,300 | B1 * | 6/2006 | Kim | B60R 11/0241 379/454 |
| 7,103,380 | B1 | 9/2006 | Ditzik | |
| 7,509,142 | B2 | 3/2009 | Ditzik | |
| 2001/0034250 | A1 | 10/2001 | Chadha | |
| 2002/0026855 | A1 * | 3/2002 | Sakai | B22F 1/0003 75/247 |
| 2002/0028665 | A1 | 3/2002 | Mankovitz | |
| 2002/0068627 | A1 * | 6/2002 | Muir | A63F 13/10 463/30 |
| 2002/0154766 | A1 * | 10/2002 | Campos | B60R 11/0211 379/454 |
| 2003/0148787 | A1 * | 8/2003 | Hao | H04M 1/6091 455/557 |
| 2004/0057199 | A1 | 3/2004 | Azuchi | |
| 2004/0111360 | A1 | 6/2004 | Albanese | |
| 2004/0139232 | A1 | 7/2004 | Giannetti et al. | |
| 2004/0160124 | A1 * | 8/2004 | Arai | B60R 11/0252 307/10.1 |
| 2004/0175055 | A1 * | 9/2004 | Miller | G06T 3/40 382/284 |
| 2004/0176142 | A1 * | 9/2004 | Thrasher | H04M 1/57 455/566 |
| 2004/0204074 | A1 * | 10/2004 | Desai | H04M 1/6041 455/557 |
| 2005/0120079 | A1 | 6/2005 | Andersen et al. | |
| 2005/0125840 | A1 | 6/2005 | Anderson et al. | |
| 2005/0165548 | A1 * | 7/2005 | Persson | G01C 21/32 701/455 |
| 2005/0204057 | A1 | 9/2005 | Anderson et al. | |
| 2005/0216599 | A1 | 9/2005 | Andersen et al. | |
| 2005/0219620 | A1 * | 10/2005 | Ohshita | G06T 5/002 358/3.01 |
| 2005/0286858 | A1 | 12/2005 | Crohas | |
| 2006/0232808 | A1 * | 10/2006 | Lyons | H04N 1/33307 358/1.13 |
| 2007/0079014 | A1 | 4/2007 | Volk et al. | |
| 2007/0118871 | A1 | 5/2007 | Crohas | |
| 2007/0124474 | A1 | 5/2007 | Margulis | |
| 2007/0219708 | A1 | 9/2007 | Brasche et al. | |
| 2011/0183713 | A1 | 7/2011 | Izutsu | |
| 2012/0203557 | A1 * | 8/2012 | Odinak | G01C 21/3608 704/270.1 |
| 2013/0031589 | A1 * | 1/2013 | Casanova | H04N 21/23431 725/93 |

FOREIGN PATENT DOCUMENTS

| | | |
|---|---|---|
| JP | 9-237145 | 9/1997 |
| JP | 2000-13776 | 1/2000 |
| JP | 2001-16545 | 1/2001 |
| JP | 2001-189808 | 7/2001 |
| JP | 2001-197167 | 7/2001 |
| JP | 2001-251449 | 9/2001 |
| JP | 2001-268180 | 9/2001 |
| JP | 2001-345894 | 12/2001 |
| JP | 2001-352373 | 12/2001 |
| JP | 2002-101457 | 4/2002 |
| JP | 2002-116843 | 4/2002 |
| JP | 2002-164968 | 6/2002 |
| JP | 2002-314646 | 10/2002 |
| JP | 2003-98974 | 4/2003 |
| JP | 2003-244289 | 8/2003 |
| JP | 2003-244343 | 8/2003 |
| WO | 01/53917 | 7/2001 |
| WO | 03/005690 | 1/2003 |

OTHER PUBLICATIONS

Supplementary European Search Report issued Nov. 5, 2009 in EP 05 81 6786.

European Search Report (ESR) issued Oct. 31, 2014 in corresponding European Patent Application No. EP 14 17 7622.

* cited by examiner

MOBILE INFORMATION PROCESSING APPARATUS

TECHNICAL FIELD

The present invention relates to a mobile information communication apparatus such as a mobile telephone unit, a connection unit used along with a mobile information communication apparatus, and an external input/output unit used along with a mobile information communication apparatus.

BACKGROUND ART

Due to recent advance of electronics, and information and communication technology, a mobile handset for operating in mobile telephone system including PHS (Personal Handyphone System), PDA (Personal Digital Assistant) and other mobile information communication apparatuses, which send or receive data by wireless communication, have become multifunctional, so that it comes normally equipped with a web browsing function, as well as with an e-mail sending and receiving function, which enables to acquire document files described by markup language and their linked files from a web server connected to the Internet, and to display texts and images in a proper layout on its own attached display means which usually is a liquid crystal display panel.

Hereinafter, "a mobile handset for operating in mobile telephone system including PHS" is referred as "a mobile telephone unit", and "a document file described by markup language" is referred as "a markup document file".

Many mobile telephone units also have a game function, by which one can enjoy a change of image displayed on their own attached display by manually operating its own attached key operating part to activate a program, which is downloaded from a web site and is stored in a storage means such as a flash memory, and to input required data. Moreover, some mobile telephone units have a television tuner function to receive a wireless signal of television broadcast and to display a picture of a TV program on their own attached display.

Hereinafter, "a wireless signal of television broadcast" is referred as "a TV signal" in the followings.

Especially since a digital terrestrial broadcast is scheduled to start, it is expected that merging of a digital television tuner function and a web browsing function in a mobile telephone unit enable to provide a user of the mobile telephone unit with a service taking both advantages of a concurrent broadcast and the Internet with personal and interactive characteristics.

Under these circumstances, a display function of image including a text and a picture is thought to be more important in a mobile information communication apparatus centering on a mobile telephone unit. However, a mobile telephone unit and other mobile information communication apparatuses cannot have large size display means because of a constraint of portability. Thus, in the case of a mobile telephone unit, screen's size is around 2.5" at maximum and screen's resolution is QVGA (Quarter Video Graphics Array). Note that because a mobile telephone unit is usually used in a vertically long configuration, QVGA means "horizontal×vertical=240×320 pixels".

When a mobile information communication apparatus receives a long e-mail of which a sentence extends in many lines and does not fall once in its own attached display screen due to a screen constrain, an e-mail receiver using the apparatus has to roll down the screen and cannot understand the meanings of the text smoothly as a result. On the other hand, an e-mail sender has to make his e-mail, which is addressed to a mobile information communication apparatus, short enough considering such screen constraint of a receiver, even though the sender uses a desktop or a notebook personal computer system of which display screen is large enough to display long text without any problem.

Hereinafter, "a desktop or a notebook personal computer system" is referred as "a PC".

Moreover, it is more constrained to browse a web page by using a mobile information communication apparatus than to read e-mail by using it. A web page intended to be browsed with a PC is usually composed of document files described by HTML (Hyper Text Markup Language) and their linked files.

Hereinafter, "a web page intended to be browsed with a PC" is referred as "a web page for PC", and "a document file described by HTML" is referred as "an HTML file".

However, it is impossible to properly browse a web page described by full-spec HTML by using an average mobile telephone unit partly because the screen's size and resolution of its own attached display means is short. It is possible only to browse a web page of so called "mobile site", which is described by a markup language specialized for a mobile information communication apparatus such as CHTML (Compact HTML), HDML (Handheld Device Markup Language) and WML (Wireless Markup Language). Thus, a web page composed of HTML files and their linked image files with high resolution is scarcely able to be displayed properly, and a mobile telephone unit is sometimes rejected by an administrator to access a web site including web page with frame layout, where a screen is divided into some frames with separate URL (Uniform Resource Locator).

Recently, mobile telephone units with "a full browser function" or "a PC site view function", with which a web page for PC can be browsed are on sale, but in many cases the same screen image as that is displayed on a PC screen and is originally intended by a web page creator is not displayed, since particular kind of rendering mode is taken such that image size is reduced to fit a screen's resolution of a mobile telephone unit that is 240 pixels in the case of vertically long QVGA, text moves to next line according to screen width, or each frame is displayed in a separate page in the case of a frame layout web page.

Some mobile telephone unit takes such rendering mode as to display a web page for PC in similar layout as displayed in a PC screen, but a web page for PC is created to target VGA screen (horizontal×vertical=640×480 pixels) at lowest, so it is difficult to understand the whole meaning of a web page because a whole page cannot be browsed without a frequent horizontal scrolling.

Hereinbefore and hereinafter, "a whole of image displayed in full screen on a display screen" is referred as" "a screen image". Therefore, for example, when a web page composed of a document file described by markup language and its linked image files is browsed and displayed in full screen, "a screen image" is a whole of a image including all of the document text, all of the individual images corresponding to the image files, and even various menu displays of browser software.

Note that, for example, when a screen image data of VGA is inputted to a display device to meet only screen mode of XGA (eXtended Graphics Array) (horizontal×vertical=1024×768 pixels) and image is displayed only in center of the screen (or in some corner), "a screen image" means a display of the display area excluding non-display area.

By using a mobile information communication apparatus, on the other hand, one can enjoy only a relatively simple game, which can be displayed in its own attached small size display means. Since, therefore, almost all games of so-called "mobile appli" were created one or more generations ago in the field of games for a specialized game machine or a PC, they are enjoyed only for time killing in a short time.

Also, when one watches a TV program by using a mobile telephone unit of which display has a resolution of QVGA at highest, it is required to thin out pixels, because effective scanning lines required by a TV broadcast, which is equivalent to vertical resolution and is 480 in the case of an analog TV broadcast, is larger than a vertical resolution of a display means belonging to a mobile telephone unit, which is 240 pixels when a mobile telephone unit is used in a horizontally long configuration (horizontal×vertical=320×240 pixels) to watch in as large a screen as possible. Especially in the case of a digital TV broadcast, effective horizontal resolution is regulated as well as number of effective scanning lines (vertical resolution). In 480i mode, of which resolution is the lowest, horizontal resolution and vertical resolution is 720 pixels and 480 pixels respectively, and in 1080i, that is so-called "full high vision", horizontal resolution and vertical resolution is 1920 pixels and 1080 pixels respectively. Anyway, a mobile telephone unit, of which display means has a resolution of QVGA at highest, cannot display an intrinsic image of a TV broadcast in full screen but can display only a poor image with a lower resolution than an intrinsic resolution.

Wherein "an intrinsic image of a TV broadcast" means "an image with an intrinsic resolution, which is displayed, when a TV signal is properly processed by a television receiver (TV receiver) with a sufficient tuner and display function".

Many users of a mobile information communication apparatus possess a PC in addition to the mobile apparatus. Such a user uses a PC when he sends and receives a long e-mail, browses a web page for PC or enjoys a complex game of which graphics can be displayed only in large size screen. And a mobile information communication apparatus is utilized only for sending and receiving a short e-mail and browsing a web page of "mobile site". In other case, only a wireless communication means of a mobile information communication apparatus, which is connected to a PC, is utilized to connect a network and data, which is acquired by using the wireless communication means, is processed only by a PC. Also, recently "AV (Audio Visual)-PC" is on sale, which has a function which enables a user to watch a TV program by using a built-in television tuner. In such a case that both of "AV-PC" and a mobile telephone unit with a television tuner are possessed, a TV program is watched by a mobile telephone unit outside or in traveling time and is watched by "AV-PC" home or in one's room.

Since, however, a PC is usually designed for a versatile use that is not restricted to sending and receiving of e-mail or browsing of web page, which can be conducted by a mobile information communication apparatus, it has a higher-performance processor, such as CPU (Central Processing Unit) or so on, than a data processing means of a mobile information communication apparatus. Moreover, it is required to prepare software, such as OS (Operating System) or so on, to activate hardware. Thus, it takes more cost to possess a PC than it does to possess a mobile telephone unit or another mobile information communication apparatus.

Therefore, it is economically irrational for major users, whose usage of a mobile information communication apparatus is restricted to sending and receiving of e-mail or browsing of web page except a telephone call, to possess a PC in order only to avoid inconvenience in reading a long e-mail or browsing a web page for PC due to short screen's size and resolution of a display means belonging to a mobile information communication apparatus.

On the other hand, although a data processing means of a mobile information communication apparatus does not have all functions as a PC's processor such as CPU, as far as a display data processing function to display an image on its own attached display means is concerned, it has a comparable function as that of a PC's processor, except that the display screen is small. Thus, it is not desirable from the viewpoint of effective resource to use both a PC and a mobile information communication apparatus as described above, because it results in low operating rate of one machine at least and it means overlapping investment to similar items.

Similar problem of "irrational overlapping investment" and "inefficient resource use" occurs in the case that a mobile information communication apparatus has a television tuner function. Because a television tuner circuit, which receives and converts a TV signal to digital data, is required in order to enjoy audio and visual of a TV program. On the other hand, an average user of a mobile information communication apparatus usually possesses a TV receiver or "AV-PC" with a larger screen besides a mobile information communication apparatus, since display means belonging to the mobile apparatus is poor both in size and in image quality. Thus, the user is forced to possess both television tuner circuit in a mobile information communication apparatus and that of a TV receiver or "AV-PC" and that results in low operating rate of one television tuner at least.

In the case of a digital terrestrial broadcast, simple overlapping investment seams not to occur because a television tuner of a TV receiver and that of a mobile information communication apparatus are different in specification, since segments (high-vision broadcast) or 4 segments (normal broadcast) out of 13 segments comprising one channel are assigned to a normal TV receiver and 1 segment is assigned to a mobile information communication apparatus. As a result of development of electrical and information technology, however, it is probable that a tuner receiving 12 segments or 4 segment broadcast, which is intended to be received by a normal TV receiver at present, will be installed in a mobile information communication apparatus, and, if then, similar problem of "irrational overlapping investment" and "inefficient resource use" will occurs in the field of a digital television tuner, which is expensive on the current level of technology.

Because of such a situation, it is recognized as an issue that, by using a mobile information communication apparatus not a PC, a long e-mail, a web page for PC, a highly entertaining game and a moving image of TV program is displayed in a larger screen, keeping the size of its own attached display means the same as present not to harm its portability. Especially, as for a web page for PC, it is an issue that a screen image similar to that of PC is displayed, and as for a TV program, it is an issue that an intrinsic image of a TV broadcast is displayed in full-screen.

In order to solve such an issue, some technologies are disclosed to display an image in a larger-screen external display device than a display means belonging to a mobile information communication apparatus by connecting the larger-screen external display device to the mobile information communication apparatus.

Hereinafter, "an external display device with a larger screen than a display means belonging to a mobile information communication apparatus" is referred as "an larger-screen external display device".

And such technologies are categorized into the following three types:

1st type: A mobile information communication apparatus and a larger-screen external display device are connected with each other via some connection unit;

2nd type: A mobile information communication apparatus and a larger-screen external display device are directly connected, and the larger-screen external display device is an image display device with a special function to make various processes on display data, which is received from the mobile information communication apparatus;

3rd type: A mobile information communication apparatus and a larger-screen external display device are directly connected, and a commonly used display device such as a TV monitor, which does not have any special means except interface means with the mobile information communication apparatus, is used as the larger-screen external display device.

The 1st types of technologies are disclosed for example in Patent Document 1, Patent Document 2, Patent Document 3 and Patent Document 4.

The technologies disclosed in these patent documents do not require to use a PC separately from a mobile information communication apparatus but some connection unit with a display data processing means such as a processor (in Patent Document 1), a CPU (in Patent Document 2), a reading control circuit (in Patent Document 3) and a display control circuit (Patent Document 4) instead. Such a display data processing means has a function only to display characters and images on the screen and is not versatile as a CPU and other processors or OS and other software of PC. Thus, it is possible that a cost of a connection unit with a display data processing means is cheaper than that of a PC, and it is more economically acceptable to possess such a connection unit than to possess a PC in addition to a mobile information communication apparatus.

Even though, a user still possesses each display data processing means with almost the same display data processing function to display images and characters both in the mobile information communication apparatus and in the connection unit except that the size of screens, on which images are displayed, are different. In this case, therefore, similar problem of "irrational overlapping investment" and "inefficient resource use" will also occur as in the case to use a PC in addition to a mobile information communication apparatus. And it is realistically possible that purchases cost of a connection unit will be the same as that of a PC or higher than that of PC.

On the other hand, the 2nd types of technologies are disclosed for example in Patent Document 5, Patent Document 6, Patent Document 7, Patent Document 8 and Patent Document 9.

This type of technologies does not require a PC or a connection approximately equivalent to a PC. However, it is required that an image display device with a display data processing means such as a control system (a micro computer) (in Patent Document 5), a control part 5 (in Patent Document 6, which is different from a control part 10 in wireless telephone), a high definition convert part and a display processing part (in Patent Document 7), an expanding circuit and a display circuit (in Patent Document 8), or a CPU (in Patent Document 9), since, in this case, a commonly used display device such as TV monitor cannot be used as it stands.

The a technology categorized in the 3rd type is also disclosed in Patent Document 6, and in the technology control part 10 in a wireless telephone has an additional display data processing function. Thus, a control part 15 in a larger-screen external display device (a mobile display) only sends display data inputted from connector terminal 13 to a liquid crystal display panel belonging to a mobile display, so that it does not have any display data processing function. This technology will be discussed in the paragraph where the 3rd type of technology is discussed.

Since, in the 2nd types of technologies, each display data processing means with almost the same function is equipped both in a mobile information communication apparatus and in a larger-screen external display device as described above, the problem of "irrational overlapping investment" and "inefficient resource use" also occurs. And since purchases cost of an image display device with such a display data processing means will be surely more expensive than that of a commonly used CRT (Cathode Ray Tube) display device and a normal liquid crystal display device, a similar irrational economic burden as occurs in when a PC is additionally used or the 1st type of technology is adopted, which should be avoided, also occurs.

On the other hand, the 3rd type of technology does not use a connection unit or a special image processor and is comprised only of a mobile information communication apparatus and a commonly used larger-screen external display device without any special functions. Thus, in general, the 3rd type of technology is supposed to be more unlikely to yield the problem of "irrational overlapping investment" and "inefficient resource use" than the 1st and the 2nd type of technology.

A mobile telephone unit with so-called "TV output function" or "AV output function" is commercially available, which is categorized in the 3rd type of technology. In such a mobile telephone unit, the mobile telephone unit is connected to a TV monitor via special cable of which telephone side terminal is a special connecting terminal and of which monitor side terminal is a video terminal and it is possible to display a still image and a moving image, which are taken by using its own attached digital camera function, and certain games on a TV monitor, of which screen is larger than that of a display means belonging to the mobile telephone unit. In this case, however, a resolution of an image displayed on a TV monitor is the same as screen's resolution of a display means belonging to a mobile telephone unit (QVGA at largest) so that a small image is displayed in the center of TV monitor or expanded image with poor quality is displayed in full screen.

At present, only still images and moving images, which are taken by a mobile telephone unit itself, or certain games are displayed on a TV monitor. Even though, however, such a mobile telephone unit has "a full browser function" or "a PC site view function" and a browsed web page for PC is displayed on a TV monitor, the same screen image as displayed on its own attached display means should be only enlarged without increasing image resolution. Therefore, a display in the same layout as that is realized on a PC screen and is originally intended by a web page creator should not be realized on a TV monitor. Moreover, even though, such a mobile telephone unit has a television tuner function and a received image is outputted to a TV monitor, an intrinsic image of a TV broadcast should not be displayed on a TV monitor.

Therefore, in order to solve the above issue, it is not sufficient for a mobile information communication apparatus to have such a function to enlarge an image, which is displayed on its own attached screen, and to display it on a larger-screen external display device as a mobile telephone unit with "TV output function" or "AV output function". It is necessary to provide a mobile information communication apparatus with a function that an image with a higher resolution than a screen's resolution of its own attached display means can be displayed on a larger-screen external display device.

If such a mobile information communication apparatus is provided, a whole image with an intrinsic resolution can be displayed on an external display with a larger screen, even if only a part image or a whole image with poor quality, of which pixels are thinned out, can be displayed on its own attached display panel. Especially, if a mobile information communication apparatus has a function to display an image of which horizontal pixels is larger than the horizontal resolution of its own display screen, number of characters can be increased which can be displayed in a line. Herewith, text does not extend in many lines nor is necessary to be rolled down frequently, even when the mobile information communication apparatus receives long e-mail. By synthesizing these effects, a web page for PC is displayed on a larger-screen external display device in the same layout as is realized on a screen of a PC.

The 3rd types of technologies, which are intended to solve issues similar to the above issue, are disclosed, for example, in Patent Document 6, Patent Document 10, Patent Document 11, Patent Document 12 and Patent Document 13.

In Patent Document 10 and Patent Document 11, it is disclosed that a TV receiver including a digital TV receiver is selected as a larger-screen external display device, and a video circuit and a video terminal, an interface circuit and a connector, or a transmitter circuit and an antenna (these all in Patent Document 10), or a neighborhood communication means (part) (in Patent Document 11) are provided as interface means between a mobile information communication apparatus and a larger-screen external display device. In these documents, however, a mechanism is not described at all how to display screen images with different information amount on display (display part) of a mobile telephone unit and on an external display with a larger screen, which have different screen sizes.

In Patent Document 11, in fact, it is disclosed that a control part 17 controls both a display part 11 and a neighborhood communication 18, but it is not disclosed at all by what mechanism said display part 17 should have in order that a screen image with less information amount is displayed on displayed part 17 and a screen image with more information amount is displayed on a digital TV 2, which sends and receives data between neighborhood communication 18. In Patent Document 10, on the other hand, it is suggested that a display actuating part controls a signal output to a (digital) TV receiver, but it is not disclosed at all how an image is displayed on a display means belonging to a mobile telephone unit.

On the other hand, in Patent Document 6 and Patent Document 12, it is disclosed that a mobile display (in Patent Document 6) or a CRT display (in Patent Document 12) is selected as a larger-screen external display device and an external interface (in Patent Document 6) or a monitor terminal (in Patent Document 12) is provided as interface means. And also a mechanism is disclosed how to display a screen image with less information amount on a display part of a wireless telephone unit (in Patent Document 6) or a personal liquid crystal display panel of a mobile telephone unit (Patent Document 12) and to display a screen image with more information amount on a larger-screen external display device.

At first, in Patent Document 6, a control part 10 of a wireless telephone unit has a function to output display data of an image both to a display part 2 of a wireless telephone unit and to an external interface 3, and also has functions as enlargement means and enlargement control means and functions as linefeed means and linefeed control means. And it is described that an image, of which size is larger than that of image displayed in the display part 2 belonging to the wireless telephone unit, is displayed on a liquid crystal display 12 belonging to the mobile display and it is possible to increase number of characters displayed in one line.

However, additional functions disclosed in the document are restricted to functions related to image enlargement, which are already realized in a mobile telephone unit with "TV output function" or "AV output function", and to functions related to a display of characters. It is impossible that solely by the technologies disclosed in Patent Document 6 that, for example, a whole image with an intrinsic resolution is displayed on an external display with a larger screen, if only a part image or a whole image with poor quality, of which pixels are thinned out, can be displayed on its own attached display panel. Therefore, the technology disclosed in Patent Document 6 cannot solve the issue completely to provide a mobile information communication apparatus with a function that an image with a higher resolution than a screen's resolution of its own attached display means can be displayed on a larger-screen external display device.

On the other hand, in Patent Document 12, it is disclosed that a display control circuit 21 has a function to send inputted display data separately both to a personal liquid crystal display panel 23 belonging to a mobile telephone unit and to a monitor terminal 25 connected to a CRT display under the control of a CPU 11. It is explained that, even if the amount of display data of image is too much to display the contents of display data on the personal liquid crystal display panel 23, all data is displayed on the CRT display without any deficiency according to this function.

This technology can seemingly solve the above issue to display a web page for PC on a larger-screen external display device in a similar image as that realized in a PC. Patent Document 12, however, has the following two problems.

Firstly, the mechanism for the display control circuit 21 to send display data separately both to the personal liquid crystal display panel 23 and to the monitor terminal 25 is not unknown. In Patent Document 12, there is a description saying "when display contents correspond to . . . " or "when the destination of display data indicates . . . ", but it is not disclosed at all by what mechanism the "correspondence" is judged or by what mechanism the "indication" is realized.

Secondly, it is not unworn what kind of image is displayed on the personal liquid crystal display panel 23 when display data corresponding to the CRT display 24 is inputted to the display control circuit 21 under the situation that the CRT display is not connected to the monitor terminal 25 and the mobile telephone unit is solely used. If, in such a situation, no image is displayed on the personal liquid crystal display panel 23, user convenience is reduced. If a part image is displayed on the personal liquid crystal display panel 2 and a whole image can be seen by screen scrolling, such mechanism to realize this is not disclosed at all.

Therefore, the technology disclosed in Patent Document 12 does not also solve the issue to provide a mobile information communication apparatus with a function to display an image with a higher resolution than a screen's resolution of its own attached display means on a larger-screen external display device.

Lastly, Patent Document 13 discloses the technology to provide a processor having a wide variety of functions in a telephone to display an image on a screen of a TV receiver that is a larger-screen external display device. The technology enables to display various information, including HTML contents comprising a web page for PC, on a large screen of a TV receiver and also is supposed to enable a web page for PC to be displayed on a larger-screen external display device in a similar image as that realized in a PC.

However, the processor installed in the telephone unit is high class enough to include various processors, such as a CPU 50a, a graphic processor, a sound processor and a DMA processor, and input/output ports. Moreover, the processor sole takes a role of image processing and, in contrast, a CPU 36 belonging to the telephone unit just takes a role of delivery of key input data and HTML contents data according to a request of the CPU 50a belonging to the processor. Thus, as for image processing, the situation is the same as the case that a mobile telephone unit and a PC are used at the same time and a wireless communication means of a mobile telephone unit is utilized only to connect to network.

Therefore, the technology disclosed in Patent Document 13 is formally categorized into the 3rd type, but there is no significant difference between 1st type and 2nd type of technology on the viewpoint of "irrational overlapping investment" and "inefficient resource use".

Patent Document 1: Japanese laid-open patent publication No. 2001-189808
Patent Document 2: Japanese laid-open patent publication No. 2001-251449
Patent Document 3: Japanese laid-open patent publication No. 2001-352373
Patent Document 4: Japanese laid-open patent publication No. 2003-244289
Patent Document 5: Japanese laid-open patent publication No. 9-237145
Patent Document 6: Japanese laid-open patent publication No. 2001-268180
Patent Document 7: Japanese laid-open patent publication No. 2002-116843
Patent Document 8: Japanese laid-open patent publication No. 2002-164969
Patent Document 9: Japanese laid-open patent publication No. 2003-98974
Patent Document 10: Japanese laid-open patent publication No. 2001-345894
Patent Document 11: Japanese laid-open patent publication No. 2002-101457
Patent Document 12: Japanese laid-open patent publication No. 2001-197167
Patent Document 13: Japanese laid-open patent publication No. 2002-314646

DISCLOSURE OF INVENTION

The present invention is invented considering the above-mentioned circumstances, and an object of the invention is to provide a mobile information communication apparatus which can display an image with a higher resolution than a screen's resolution of its own attached display means on a connected larger-screen external display device, without any special display data generating means for the larger-screen external display device being used separately from an originally equipped display data generating means, which is necessary to display an image on its own attached display means, but only with an addition of an interface means between the mobile information communication apparatus and the larger-screen external display device and a little addition of functions to its own display data generating means.

Hereinbefore and hereinafter, "display data generating means which is originally equipped to a mobile information communication apparatus and is necessary to display an image on its own attached display means" is referred as "its own attached display data generating means".

Especially, as for a web page for PC, the present invention provides a mobile information communication apparatus, which can display a similar image as that realized in a PC and, it can be seen without frequent horizontal scroll. Also, as for a TV program, the present invention provides a mobile information communication apparatus, which can display an intrinsic image of a TV broadcast.

The present invention also provides a connection unit, which is used along with the mobile information communication apparatus and the larger-screen external display device and enables an image with a higher resolution than a screen's resolution of a display means belonging to the mobile information communication apparatus to be displayed on the larger-screen external display device. Moreover, the present invention also provides an external input/output unit, which is used along with the mobile information communication apparatus and displays an image with a higher resolution than a screen's resolution of a display means belonging to the mobile information communication apparatus on an external display panel belonging to itself.

In order to achieve above objectives, according to the first invention of the present invention related to a mobile information communication apparatus, there is provided a mobile information communication apparatus comprising: a data input means by which a user inputs data by a manual operation; a data sending and receiving means which receives and converts a wireless signal into a digital signal, and converts a digital signal, which is received from aftermentioned data processing means, into a wireless signal and sends it; a storage means which stores a program, which activates aftermentioned data processing means, and a data file, which can be processed by aftermentioned data processing means; a data processing means which makes necessary processes on a digital signal, which is received from said data sending and receiving means, and/or data, which is read out from said storage means, and generates and sends plotting command/data and other data, according to data, which is inputted by said data input means, and to a program, which is stored in said storage means, wherein "plotting command/data" means "plotting command/or image data"; a display means which is composed of a display panel A, on which an image is displayed as a result of an activation of pixels comprising its screen, and a display control means A, which receives plotting command/data generated by said data processing means and activates each pixel of said display panel A according to the plotting command/data; an interface means A1 which receives plotting command/data, which is generated by said data processing means, and sends an external display signal to a connected external display device according to the plotting command/data, wherein "an external display signal" means "a display signal which is sent to a connected external display device" and "a connected external display device" means "an external display device which is connected directly or via necessary mediational means to said interface means A1"; and a destination assigning means which assigns at least either said display control means A or said interface means A1 as a destination of plotting command/data, which is generated by said data processing means; wherein said data processing means and said interface means A1 are configured to send a higher-resolution external display signal from said interface means A1, when said destination assigning means assigns said interface means A1 as a destination of the plotting command/data, wherein "a higher-resolution external display signal" means "an external display signal which a high-resolution external display device receives and properly processes, so that a higher-resolution image is displayed on a screen of the high-resolution external display", "a high-resolution external display device" means "an external display device with a sufficient high resolution" and "a higher-resolution image" means "an image with a higher resolution than a screen's resolution (horizontal pixels×vertical pixels) of said display panel A".

And according to the second invention of the present invention related to a mobile information communication apparatus, there is provided a mobile information communication apparatus according to the first invention, wherein said data processing means and said interface means A1 are configured to send a higher-resolution external display signal from said interface means A1, which a high-resolution external display device, which is connected to the interface means A1, receives and properly processes, so that a higher-resolution screen image, of which ratio of horizontal pixels and vertical pixels lays between 5:4 and 16:9, is displayed on a screen of the high-resolution external display, wherein "a higher-resolution screen image" means "a screen image with a higher resolution than the screen's resolution of said display panel A".

And according to the third invention of the present invention related to a mobile information communication apparatus, there is provided a mobile information communication apparatus according to the first or the second invention, wherein an intrinsic resolution of a higher-resolution external display signal is fixed to a fixed resolution, wherein "an intrinsic resolution of a higher-resolution external display signal" means "a resolution of an image which is displayed on a screen of a high-resolution external display device, when the high-resolution external display device receives and properly processes the higher-resolution external display signal" and "a fixed resolution" means "a resolution which is previously fixed".

And according to the fourth invention of the present invention related to a mobile information communication apparatus, there is provided a mobile information communication apparatus according to the first or the second invention, further comprising a resolution designating means which selects and assigns a resolution from a fixed range of resolutions; wherein said data processing means and said interface means A1 are configured to send a higher-resolution external display signal from said interface means A1, of which an intrinsic resolution is the resolution assigned by said resolution designating means.

And according to the fifth invention of the present invention related to a mobile information communication apparatus, there is provided a mobile information communication apparatus according to anyone of the first to the fourth invention, wherein said data processing means and said interface means A1 are configured to perform the following functions:

a function to generate bit-mapped data, which describes an image, which is displayed on a high-resolution external display device connected to the interface means A1 when the high-resolution external display device receives and properly processes a higher-resolution external display signal, wherein "bit-mapped data" means "bit mapped type image data which describes an image by specifying a color of each pixel of the image in digital data; and a function to convert the bit-mapped data to an external display signal and send the external display signal from said interface means A1.

Hereinbefore and hereinafter, "bit mapped type" means generally a type of image description in which the color of pixels comprising a real or virtual screen of a display device is specified in 8 bit data (256 colors), 24 bit data (16780000 colors). Therefore, "bit-mapped data" is not restricted in BMP (Bit Map) format data, which is a type of image saving format, and is also saved in a variety of saving format such as TIFF (Tagged Image File Format), JPEG (Joint Photographic Experts Group), GIF (Graphic Interchange Format) and PNG (Portable Network Graphics) as well as BMP.

And according to the sixth invention of the present invention related to a mobile information communication apparatus, there is provided a mobile information communication apparatus according to the fifth invention, wherein said data processing means has the following functions: a function to generate and send bit-mapped data, which describes an image, which is displayed on said display panel A and has the same resolution as the screen's resolution of the display panel A, to said display control means A, when said destination assigning means assigns said display control means A as a destination of the plotting command/data; and a function to generate and send bit-mapped data, which describes an image, which is displayed on a high-resolution external display device connected to said interface means A1 and has the designated resolution, when said destination assigning means assigns said interface means A1 as a destination of the plotting command/data; wherein said display control means A has a function to activates each pixel of said display panel A according to the bit-mapped data, which is received from said data processing means; and wherein interface means A1 has a function to convert the bit-mapped data, which is received from said data processing means, to an external display signal and to send it.

And according to the seventh invention of the present invention related to a mobile information communication apparatus, there is provided a mobile information communication apparatus according to the fifth or the sixth invention, wherein said data processing means and said interface means A1 are configured to perform the following functions: a function to create a virtual screen with no lower logical resolution than the designated resolution and to generate bit-mapped data on the virtual screen; and a function to cut a portion of the generated bit-mapped data describing an image, which is displayed on a high-resolution external display device connected to said interface means A1 and has the designated resolution, and to convert it to an external display signal and to send it from the interface means A1.

And according to the eighth invention of the present invention related to a mobile information communication apparatus, there is provided a mobile information communication apparatus according to the seventh invention, wherein a logical resolution of the virtual screen, which is created cooperatively by said data processing means and said interface means A1, is previously fixed to that no lower than the maximum in the range of resolution, from which said resolution designating means can select in the case that a resolution designating means is provided, and, otherwise, to that no lower than the fixed resolution, respectively.

And according to the ninth invention of the present invention related to a mobile information communication apparatus, there is provided a mobile information communication apparatus according to the seventh invention, wherein said data processing means and said interface means A1 are configured to flexibly set a logical resolution of the virtual screen to that no lower than the maximum in the range of resolution, from which said resolution designating means can select in the case that a resolution designating means is provided, and, otherwise, to that no lower than the fixed resolution, respectively.

And according to the tenth invention of the present invention related to a mobile information communication apparatus, there is provided a mobile information communication apparatus according to any one of the seventh to the ninth invention, wherein said data processing means are equipped with: a central processing circuit 1 which provide aftermentioned graphic controller 1 with a plotting command to generate bit-mapped data on the virtual screen and with a sending command to cut a necessary portion of the bit-mapped data and to send it at least either to said display control means A or to said interface means A1, according to assignment by said destination assigning means; a graphic controller 1 which has the following functions: a function to generate bit-mapped data on the virtual screen, according to said plotting command; a function to write the bit-mapped data in aftermentioned bit map memory 1; a function to cut a portion of the bit-mapped data describing an image from the bit map memory 1, which is displayed on said display panel A and has the same resolution as the display panel A, and to send it to said display control means A, in the case that said sending command commands said graphic controller 1 to send the bit-mapped data to said display control means A; and a function to cut a portion of the bit-mapped data describing an image from the bit map memory 1, which is displayed on a screen of an external display device connected to said interface means A1 and has the designated resolution, and to send it to the interface means A1, in the case that said sending command commands said graphic controller 1 to send the bit-mapped data to the interface means A1; and a bit map memory 1 which stores bit-mapped data, which is generated by said graphic controller 1 on the virtual screen.

And according to the eleventh invention of the present invention related to a mobile information communication apparatus, there is provided a mobile information communication apparatus according to the tenth invention, wherein said graphic controller 1 is equipped with: a bit-mapped data generating circuit which generates and writes bit-mapped data in said bit map memory 1, according to the plotting command, which is received from said data processing means, and cuts a necessary portion of the bit-mapped data and outputs it to aftermentioned bit-mapped data transfer circuit; and a bit-mapped data transfer circuit which sends the bit-mapped data, which is received from said bit-mapped data generating circuit, at least either to said display control means A or to said interface means A1, according to the sending command, which is received from said bit-mapped data generating circuit.

And according to the twelfth invention of the present invention related to a mobile information communication apparatus, there is provided a mobile information communication apparatus according to any one of the seventh to the ninth invention, wherein said data processing means has a function to generate and send a plotting command at least either to said display control means A or to said interface means A1 according to the assignment by said destination assigning means; and wherein said interface means A1 is equipped with: a graphic controller 2 which has the following functions: a function to generate bit-mapped data on the virtual screen, according to said plotting command, which is received from said data processing means; a function to write the bit-mapped data in aftermentioned bit map memory 2; and a function to cut a portion of the bit-mapped data describing an image from the bit map memory 2, which is displayed on a screen of an external display device connected to said interface means A1 and has the designated resolution, and to send it to aftermentioned external display signal output means; a bit map memory 2 which stores bit-mapped data on the virtual screen generated by said graphic controller 2; and an external display signal output means which converts bit-mapped data received from said graphic controller 2 to an external display signal and sends it.

And according to the thirteenth invention of the present invention related to a mobile information communication apparatus, there is provided a mobile information communication apparatus according the twelfth invention, wherein said data processing mean is equipped with: a central processing circuit 2 which generates a plotting command; a plotting command transfer circuit which sends the plotting command, which is received from said central processing circuit 2, at least either to said display control means A or to said interface means A1 according to the assignment by said destination assigning means.

And according to the fourteenth invention of the present invention related to a mobile information communication apparatus, there is provided a mobile information communication apparatus according to any one of the fifth to the thirteenth invention, wherein said interface means A1 has a function to convert bit-mapped data, which is received from said data processing means or is generated by the interface means A1, to a digital signal, which is transmitted in the format of any one of digital RGB, TMDS, LVDS (or LDI) and GVIF, and to send it to a connected external display device.

And according to the fifteenth invention of the present invention related to a mobile information communication apparatus, there is provided a mobile information communication apparatus according to any one of the fifth to the thirteenth invention, wherein said interface means A1 has a function to convert bit-mapped data, which is received from said data processing means or is generated by the interface means A1, to an analog signal, which is transmitted in the format of any one of analog RGB, composite video signal, separate video signal and component video signal, and send it a connected external display device.

And according to the sixteenth invention of the present invention related to a mobile information communication apparatus, there is provided a mobile information communication apparatus according to any one of the first to the fifteenth invention, further comprising a built-in battery; wherein an external terminal, which comprise a said interface means A1, has a charge terminal A to charge said built-in battery, in addition to a signal terminal to send an external display signal to a connected external display device.

And according to the seventeenth invention of the present invention related to a mobile information communication apparatus, there is provided a mobile information communication apparatus according to any one of the first to the sixteenth invention, further comprising: an interface means A2 which receives external input data, makes necessary processes on and sends it to said data processing means, wherein "external input data" means "data inputted by a connected external input device"; and a source assigning means which assigns at least either said data input means or the external input device, as an input source of input data for said data processing means.

And according to the eighteenth invention of the present invention related to a mobile information communication apparatus, there is provided a mobile information communication apparatus according to the seventeenth invention, further comprising a data transmit means, which receives at least either input data from said data input means or input data from said interface means A2 according to the assignment of said source assigning means and makes necessary processes on and sends it to said data processing means.

And according to the nineteenth invention of the present invention related to a mobile information communication apparatus, there is provided a mobile information communication apparatus according to the seventeenth or the eighteenth invention, wherein an external terminal composing said interface means A1 and an external terminal composing said interface means A2 are components of an integral external connection terminal part A.

And according to the twentieth invention of the present invention related to a mobile information communication apparatus, there is provided a mobile information communication apparatus according to any one of the seventeenth to the nineteenth invention, further comprising an interface means A3 which exchanges data between a connected external storage device; wherein said data processing means has a function to write and/or read out data by accessing the external storage device.

And according to the twenty-first invention of the present invention related to a mobile information communication apparatus, there is provided a mobile information communication apparatus according to the twentieth invention, wherein an external terminal composing said interface means A1 and an external terminal composing said interface means A3 are components of an integral external connection terminal part A'.

And according to the twenty-second invention of the present invention related to a mobile information communication apparatus, there is provided a mobile information communication apparatus according to any on of the first to the twenty-first invention, wherein said data sending and receiving means and said data processing means are configured to perform the following functions: a function to send a wireless signal which includes user-agent information and conforms to the Internet Protocol; a function to acquire a data file from a web server, which is connected to the Internet, by receiving a wireless signal which conforms to the Internet Protocol; and a function to generate plotting command/data by directly processing the data file in real time and/or by reading out and processing the data file, which is once stored in said storage means.

And according to the twenty-third invention of the present invention related to a mobile information communication apparatus, there is provided a mobile information communication apparatus according to twenty-second invention, wherein said data sending and receiving means and said data processing means are configured so that said user-agent information includes information which specifies whether said destination assigning means assigns said interface means A1 as a destination of plotting command/data or not.

And according to the twenty-fourth invention of the present invention related to a mobile information communication apparatus, there is provided a mobile information communication apparatus according to anyone of the first and the twenty-third invention, wherein said data sending and receiving means has a function to receive and convert a wireless moving image signal to a digital signal and send the digital signal to said data processing means, wherein "a wireless moving image signal" means "any one of wireless signals of an analog TV signal, a digital TV signal, a mobile TV telephone signal and a wireless streaming signal which conforms to the Internet Protocol"; and wherein said data processing means has a function to generate plotting command/data by directly processing the digital signal in real time and/or by reading out and processing a processable data file, in which the digital signal is once stored in said storage means.

And according to the twenty-fifth invention of the present invention related to a mobile information communication apparatus, there is provided a mobile information communication apparatus to any one of the first to the twenty-fourth invention, further comprising an imaging means which converts light from a subject to an electrical image signal by imaging elements such as a CCD (Charge-Coupled Device) and a CMOS (Complementary Metal Oxide Semiconductor) sensor, and, moreover, converts the electrical image signal to a digital signal and sends the digital signal to said data processing means, wherein "an electrical image signal" means "an electrical signal of each pixel to which light is converted by imaging elements"; wherein said data processing means has a function to generate plotting command/data by directly processing the digital signal in real time and/or by reading out and processing a processable data file, in which the digital signal is once stored in said storage means.

And according to the twenty-sixth invention of the present invention related to a mobile information communication apparatus, there is provided a mobile information communication apparatus according to any one of the twenty-second to the twenty-fifth invention, wherein said data processing means has a function to generate plotting command/data of a page image, which is divided into several frames in some cases, by processing one or more markup document files and its linked files, which is acquired from a web server cooperatively by said data sending and receiving means and said data processing means, or by processing one or more markup document files and its linked files, which are stored in said storage means, wherein "markup document files" means "document files described in HTML, XML or any markup language based on HTML or XML".

And according to the twenty-seventh invention of the present invention related to a mobile information communication apparatus, there is provided a mobile information communication apparatus according to the twenty-sixth invention, wherein said data processing means and said display control means A are configured to display a page image on said display panel A, in which text automatically moves to next line corresponding to the screen's horizontal resolution of the display panel A, when the data processing means processes a markup document with a liquid layout and said destination assigning means assigns the display control means A as a destination of the plotting command/data; and wherein said data processing means and said interface means A1 are configured to send an external display signal which a high-resolution external display device connected to the interface means A1 receives and properly processes, so that a page image, in which text automatically moves to next line corresponding to the horizontal resolution of the designated resolution, can be displayed on the screen of the high-resolution external display, when the data processing means processes a markup document with a liquid layout and said destination assigning means assigns the interface means A1 as a destination of the plotting command/data.

And according to the twenty-eighth invention of the present invention related to a mobile information communication apparatus, there is provided a mobile information communication apparatus according to the twenty-sixth invention, wherein said data processing means and said display control means A are configured to display a part image on said display panel A, which is cut from a page image corresponding to the screen's horizontal resolution of the display panel A, when the data processing means processes a markup document with a fixed-width layout, of which width is wider than the screen's horizontal resolution of the display panel A and narrower than the horizontal resolution of the designated resolution and said destination assigning means assigns the display control means A as a destination of the plotting command/data; and wherein said data processing means and said interface means A1 are configured to send an external display signal which a high-resolution external display device connected to the interface means A1 receives and properly processes, so that a horizontal whole of a page image can be displayed on the screen of the high-resolution external display, when the data processing means processes a markup document with a fixed-width layout, of which width is wider than the screen's horizontal resolution of the display panel A and narrower than the horizontal resolution of the designated resolution and said destination assigning means assigns the interface means A1 as a destination of the plotting command/data.

And according to the twenty-ninth invention of the present invention related to a mobile information communication apparatus, there is provided a mobile information communication apparatus according to the twenty-second and twenty-eighth invention, wherein said data processing means has a function to process a digital image signal or an image data file and to generate plotting command/data of the whole image of the intrinsic image of said digital image signal or said image data file, wherein "a digital image signal" means "a digital signal, to which a wireless moving image signal, which is received by said data sending and receiving means, is converted, or a digital signal, to which an electrical image signal is converted", "an image data file" means "an image data file stored in said storage means" and "an intrinsic image of a digital image signal or an image data file" means "an image with its intrinsic resolution, which is displayed on a display means, when the display means properly processes the digital image signal or the image data file".

And according to the thirtieth invention of the present invention related to a mobile information communication apparatus, there is provided a mobile information communication apparatus according to the twenty-ninth invention, wherein said data processing means and said display control means A are configured to display an image on said display panel A, which represents the whole of the object of the intrinsic image of said digital image signal or said image data file but has no higher resolution than the screen's resolution of the display panel A by thinning out a part of the digital image signal or a part of data of the image data file, when the resolution of the intrinsic image is higher than the display panel A and said destination assigning means assigns the display control means A as a destination of the plotting command/data; and wherein said data processing means and said interface means A1 are configured to send an external display signal which a high-resolution external display device connected to the interface means A1 receives and properly processes, so that the intrinsic image of a digital image signal or an image data can be displayed on the screen of the high-resolution external display, when the resolution of the intrinsic image is higher than the display panel A and said destination assigning means assigns the interface means A1 as a destination of the plotting command/data.

And according to the thirty-first invention of the present invention related to a mobile information communication apparatus, there is provided a mobile information communication apparatus according to the twenty-ninth invention, wherein said data processing means and said display control means A are configured to display a part image on said display panel A, which is cut from the intrinsic image of said digital image signal or said image data corresponding to the screen's resolution of the display panel A, when the resolution of the intrinsic image is higher than the display panel A and said destination assigning means assigns the display control means A as a destination of the plotting command/data; and wherein said data processing means and said interface means A1 are configured to send an external display signal which a high-resolution external display device connected to the interface means A1 receives and properly processes, so that the intrinsic image of a digital image signal or an image data can be displayed on the screen of the high-resolution external display, when the resolution of the intrinsic image is higher than the display panel A and said destination assigning means assigns the interface means A1 as a destination of the plotting command/data.

And according to the thirty-second invention of the present invention related to a mobile information communication apparatus, there is provided a mobile information communication apparatus according to any one of the twenty-ninth to the twenty-ninth to thirty-first invention, wherein said data sending and receiving means has a function to receive and convert a GPS signal to a digital signal, which can be processed by said data processing means, and send the digital signal to the data processing means, wherein "a GPS signal" means "a wireless signal sent from GPS satellite"; and wherein said data processing means has a function to generate plotting command/data of a map image including its present location information in real time by processing said digital signal and either said wireless moving image signal or said image data file which includes map information.

And according to the thirty-third invention of the present invention related to a connection unit applied to a mobile information communication apparatus, there is provided a connection unit used along with a mobile information communication apparatus according to anyone of the first to the twenty-first invention, the connection unit comprising: an interface means B1 which is connected to an interface means A1 of the mobile information communication apparatus and receives an external display signal; and an interface means C1 between an external display device.

And according to the thirty-fourth invention of the present invention related to a connection unit applied to a mobile information communication apparatus, there is provided a connection unit used along with a mobile information communication apparatus according to any one of the seventeenth to the twenty-first invention, the connection unit comprising: an interface means B1 which is connected to an interface means A1 of the mobile information communication apparatus and receives an external display signal; an interface means B2 which is connected to an interface means A2 of the mobile information communication apparatus and sends external input data; an interface means C1 between an external display device; and an interface means C2 between an external input device.

And according to the thirty-fifth invention of the present invention related to a connection unit applied to a mobile information communication apparatus, there is provided a connection unit used along with a mobile information communication apparatus according to the twentieth or twenty-first invention, the connection unit comprising: an external storage means into which data is written and/or from which data is read out via aftermentioned interface means B3; an interface means B1 which is connected to an interface means A1 of the mobile information communication apparatus and receives an external display signal; an interface means B2 which is connected to an interface means A2 of the mobile information communication apparatus and sends external input data; an interface means C1 between an external display device; an interface means C2 between an external input device; and an interface means B3 which is connected to said interface means A3 of the mobile information communication apparatus and exchanges data between said external storage means; wherein the abovementioned means are integrated in a virtually unified manner.

And according to the thirty-sixth invention of the present invention related to a connection unit applied to a mobile information communication apparatus, there is provided a connection unit according to any one of thirty-third to thirty-fifth invention, further comprising a scan converting means which receives an external display signal via said interface means B1 and converts the external display signal to a display signal conforming to a screen's resolution and/or a scanning type of an external display device connected to said interface means C1.

And according to the thirty-seventh invention of the present invention related to a connection unit applied to a mobile information communication apparatus, there is provided a connection unit according to any one of thirty-third to thirty-sixth invention, wherein it is used along with a mobile information communication with a built-in battery and charge terminal A to charge the built-in battery; further comprising: a DC power supply; and an external terminal, which comprises said interface means B1, has a charge terminal B, which is connected to said charge terminal A and supplies said built-in battery with DC power from said DC power supply, to charge said built-in battery, in addition to a signal terminal to send an external display signal to a connected external display device.

And according to the thirty-eighth invention of the present invention related to an external input/output unit applied to a mobile information communication apparatus, there is provided an external input/output unit used along with a mobile information communication apparatus according to any one of seventeenth to twenty-first invention, the external input/output unit comprising: an external display means which is composed of a display panel D, on which an image is displayed as a result of an activation of pixels comprising its screen, and a display control means D, which activates each pixel of said display panel D according to external display data received via aftermentioned interface means D1; an external data input means by which a user inputs data by a manual operation; an interface means D1 which is connected to an interface means A1 of the mobile information communication apparatus and to said display control means D; and an interface means D2 which is connected to an interface means A2 of the mobile information communication apparatus and to said external data input means; wherein the abovementioned means are integrated in a virtually unified manner.

And according to the thirty-ninth invention of the present invention related to an external input/output unit applied to a mobile information communication apparatus, there is provided an external input/output unit used along with a mobile information communication apparatus according to the twentieth or the twenty-first invention, the external input/output unit comprising: an external display means which is composed of a display panel D, on which an image is displayed as a result of an activation of pixels comprising its screen, and a display control means D, which activates each pixel of said display panel D according to external display data received via aftermentioned interface means D1; an external data input means by which a user inputs data by a manual operation; an external storage means into which data is written and/or from which data is read out via aftermentioned interface means D3; an interface means D1 which is connected to an interface means A1 of the mobile information communication apparatus and to said display control means D; an interface means D2 which is connected to an interface means A2 of the mobile information communication apparatus and to said external data input means; and an interface means D3 which is connected to said interface means A3 of the mobile information communication apparatus and exchanges data between said external storage means; wherein the abovementioned means are integrated in a virtually unified manner.

And according to the fortieth invention of the present invention related to an external input/output unit applied to a mobile information communication apparatus, there is provided an external input/output unit according to the thirty-eighth or thirty-ninth invention, wherein said interface means D1 and said display control means D are configured to perform a multiscan function to convert an external display signal, which is received via the interface means D1, to a display signal conforming to a screen's resolution and/or a scanning type of said display panel D.

And according to the forty-first invention of the present invention related to an external input/output unit applied to a mobile information communication apparatus, there is provided an external input/output unit according to any one of the thirty-eighth to the fortieth invention, wherein said external display means has a touch panel function which enables for a user to input data by touching a surface of the display panel D comprising the external display means.

And according to the forty-second invention of the present invention related to an external input/output unit applied to a mobile information communication apparatus, there is provided an external input/output unit according to any one of the thirty-eighth to the forty-first invention, wherein it is used along with a mobile information communication with a built-in battery and charge terminal A to charge the built-in battery; further comprising: a DC power supply; and an external terminal, which comprises said interface means D1, has a charge terminal D, which is connected to said charge terminal A and supplies said built-in battery with DC power from said DC power supply, to charge said built-in battery, in addition to a signal terminal to send an external display signal to a connected external display device.

And according to the forty-third invention of the present invention related to an external input/output unit applied to a mobile information communication apparatus, there is provided an external input/output unit according to any one of the thirty-eighth to the forty-second invention, wherein the followings are installed inside of the unified chassis: a circuit comprising said interface means D1; a circuit comprising said interface means D2; said external storage means, if installed; and a circuit composing said interface means D3, if installed; wherein keys comprising said external data input means are installed on the top surface of the chassis; wherein the following terminals are installed on the side surface or on the bottom surface of the chassis: an external terminal comprising said interface means D1; an external terminal comprising said interface means D2; and an external terminal comprising said interface means D3, if installed; wherein said display panel D and the chassis are hinged together.

And according to the forty-fourth invention of the present invention related to an external input/output unit applied to a mobile information communication apparatus, there is provided an external input/output unit according to any one of the thirty-eighth to the forty-second invention, wherein the followings are installed inside of the unified chassis: a circuit comprising said interface means D1; a circuit comprising said interface means D2; said external storage means, if installed; and a circuit composing said interface means D3, if installed; wherein said display panel D is installed on the top surface of the chassis; wherein the following terminals are installed on the side surface or on the bottom surface of the chassis: an external terminal comprising said interface means D1; an external terminal comprising said interface means D2; and an external terminal comprising said interface means D3, if installed; wherein keys comprising said external data input means are installed in a frame part of said display panel D installed on the top surface of the chassis.

In a mobile information communication apparatus according to any one of the first to the fifteenth invention, a higher-resolution image, which has a higher resolution than a screen's resolution of a display panel belonging to a mobile information communication apparatus, can be displayed on a high-resolution external display device connected to an interface means A1 of a mobile information communication apparatus, by sending a higher-resolution external display signal to the high-resolution external display device. Herewith, a whole image with an intrinsic resolution can be displayed on a high-resolution external display device, even if only a part image or a whole image with poor quality, of which pixels are thinned out, can be displayed on a display panel belonging to a mobile information communication apparatus. Since, especially, a function is realized to send a horizontally higher-resolution external display signal, of which a horizontal intrinsic number of pixels is larger than a screen's horizontal resolution of a display panel belonging to a mobile information communication apparatus, number of characters, which are displayed in a line of a high-resolution external display device, can be increased more than that in a line of a display panel belonging to a mobile information communication apparatus. Herewith, such a situation can be avoided that it is difficult to understand a long e-mail because its text extends in so many lines as to be rolled down frequently.

Moreover, a function to send a higher-resolution external display signal is realized only by a data processing means, which is indispensable to display an image on a display panel belonging to a mobile information communication apparatus, and an interface means, which is indispensable to be connected with an external display device. Therefore, it is not necessary for a mobile information communication apparatus to be equipped with a special display data generating means for an external display device, which is indispensable in conventional technologies, separately from a display data processing means which is originally equipped to a mobile information communication apparatus. Thus, the problem of "irrational overlapping investment" and "inefficient resource use" can be avoided.

Especially according to the second invention, a higher-resolution screen image can be displayed in full screen on a screen of a high-performance external display device, which has a multiscan function and has a high enough screen's resolution, by connecting the high-performance external display device to a interface means A1 of a mobile information communication apparatus. In the case, for example, a mobile information communication apparatus has a display panel with a screen's resolution of QVGA and has a function to send a higher-resolution external display signal of which intrinsic resolution is XGA (horizontal resolution: vertical resolution=4:3), a screen image of XGA, that is larger than a screen's resolution of a display panel belonging to a mobile information communication apparatus (QVGA), can be displayed in full screen on a screen of high-performance external display device, when the high-performance external display device, which has a multiscan function and has a screen's resolution of SXGA (Super XGA) (horizontal×vertical=1280×1024 pixels), is connected to a interface means A1 of a mobile information communication apparatus.

The same effect is also realized by connecting an interface means A1 of a mobile information communication apparatus and a high-resolution external display device via a connection unit which has a function to upscan an intrinsic resolution of a higher-resolution external display signal to a screen's resolution of a high-resolution external display device. In the case, for example, a mobile information communication apparatus has a display panel with a screen's resolution of QVGA and has a function to send a higher-resolution external display signal of which intrinsic resolution is XGA, and, on the other hand, a high-resolution external display device is a so-called "full high-vision TV monitor" (horizontal×vertical=1920×1080 pixels), a screen image of XGA, that is larger than a screen's resolution of a display panel belonging to a mobile information communication apparatus (QVGA), can be displayed in full screen on a screen of the full high-vision TV monitor, if the full high-vision TV monitor and the interface means A1 of a mobile information communication apparatus are connected with each other via a connection unit with a necessary upscan function.

Since, however, horizontal-vertical ratio of XGA and that of full high-vision size is different each other, there can be nothing to be displayed around both end of the screen. And a smooth image, of which resolution is larger than XGA, can be displayed by adding a pixel interpolation function to the connection unit.

On the other hand, especially according to the third invention, a higher-resolution screen image is displayed in full screen on a high-resolution external display device without using a display device with a multiscan function, by selecting a suitable display device with a resolution corresponding to a previously fixed resolution from candidates of commonly used display devices such as a PC display device and a TV monitor, and by using it as the high-resolution external display device. And especially according to the fourth invention, a higher-resolution screen image is displayed in full screen on a high-resolution external display device, by using a suitable commonly used display such as a PC display device and a TV monitor as the high-resolution external display device and by selecting and assigning the screen's resolution of a high-resolution external display device by a resolution designating means.

Note that in the case a high-performance external display device with a multiscan function is used as a high-resolution external display device, a screen image with the designated resolution can be displayed in full screen on the screen of the high-performance external display device, only if the designated resolution is lower than the screen's resolution of the high-performance external display, even if the designated resolution is not equal to the screen's resolution of the high-performance external display.

And especially to the fourteenth or fifteenth invention, a display device with a commonly used type of interface means is adopted as a high-resolution external display device.

Especially according to the fourteenth invention, since signal conversion of "digital (bit-mapped data)->analog->digital" becomes dispensable in the case a digital display device such as a liquid crystal display device is used as a high-resolution external display device, image degradation due to a signal conversion can be avoided. On the other hand, according to the fifteenth invention, a TV monitor and a commonly used PC display device with an analog RGB interface, such as VGA connector or so on, can be used as a high-resolution external display device.

According to the sixteenth invention of a mobile information communication apparatus, when a higher-resolution image is displayed on a screen of a high-resolution external display device connected to an interface means A1 of a mobile information communication apparatus, a built-in battery of the mobile information communication apparatus can be charged by being supplied with electrical power, via a charge terminal A, from the high-resolution external display device, a connection unit connecting said interface means A1 and the high-resolution external display device, an external input/output unit unifying a connection unit and external display devices, or so on.

According to any one of the seventeenth to the nineteenth invention of a mobile information communication apparatus, not only a higher-resolution image can be displayed on a screen of a screen of a high-resolution external display device connected to an interface means A1 of a mobile information communication apparatus, but also data can be inputted with a full keyboard by connecting a full keyboard to an interface means A2 of the mobile information communication apparatus.

Hereinbefore and hereinafter, "full size keyboard such as Japanese 106 keyboard and Japanese 109 keyboard, which are of JIS (Japanese Industrial Standard) key arrangement" is referred as "full keyboard".

In the first place, in a mobile telephone unit and other mobile information communication apparatuses, character input operations by using its own attached operation keys, such as editing of an e-mail, an entry of URL of a web site, character input to an entry form in a web page, and editing of addresses in a telephone directory, are increased. Despite this, operationality of character input is bad in a mobile information communication apparatus, because its own attached operation keys are smaller than those of a full keyboard and a center distance between neighboring keys is also smaller due to a constraint of portability. Especially, in the case of a mobile telephone unit, since operation keys are restricted to a few keys composed of numeric keys and several function keys, in order to input, for example, the fifth character of the Japanese syllabary, such operations as to push a certain numeric key (normally key of "1"), which is assigned to first line of the Japanese syllabary ("kana"), five times after changing an input mode to Japanese input mode by using function keys. Therefore, it is very stressful for a user to input a number of characters, in such a case of editing a long e-mail.

In contrast, according to any one of the seventeenth to nineteenth invention of a mobile information communication apparatus, a problem of a constraint in data input, as well as a screen constraint due to its portability, is reduced or is solved. In fact, only by connecting an external display device, such as a commonly used PC display device to an interface means A1, and connecting an external input device such as a full keyboard to an interface A2, almost the same operationability as that in the conventional case that both of a mobile information communication apparatus and a PC are used, as far as such operations as editing, sending and receiving of e-mail, browsing of a web page, a bi-directional communication using the Internet or so on.

On the other hand, according to any one of the seventeenth to nineteenth invention of a mobile information communication apparatus, it sometimes more convenient to connect the invented mobile information communication apparatus to an external display device and an external input device, than that both a conventional mobile information communication apparatus and a PC are used as described below:

A user, who possesses a PC along with a conventional mobile information communication apparatus, is usually required to have two e-mail addresses, one of which is of a mobile information communication apparatus and the other of which is of a PC, and is also required to check delivery status of e-mails of both of a mobile information communication apparatus and a PC. Some Internet service provider provide services that an e-mail sent to one and the same address can be received by both of a mobile information communication apparatus and a PC. In this case, however, such an inconvenience, that an e-mail received by a PC is not recorded in a receiving history in a mobile information communication apparatus and vice versa, occurs, since mailer software of the mobile information communication apparatus is different from that of the PC. And an extra effort is required to edit both an address list in a mobile information communication apparatus and that in a PC.

Moreover, when, for example, a use comes back to the circumstance, in which he can use a PC, from the situation, in which he is just browsing a web page outside with a mobile information communication apparatus, another extra effort is required to start up a PC and reentry URL of the web page, although the mobile information communication apparatus has already been connected to the web site. Also, when a use comes back to the circumstance, in which he can use a PC, from the situation, in which he is just inputting e-mail text outside by operating operation keys of a mobile information communication apparatus, it is required to start up a PC and start to input text from its beginning. Thus, it is impossible to move smoothly from a work on a mobile information communication apparatus to that on a PC, and there is a problem that it takes longer to start up a PC than to start up a mobile telephone unit.

In contrast, according to any one of the seventeenth to the nineteenth invention of a mobile information communication apparatus, in the case that the invented mobile information communication apparatus is used in connection with an external display device and an external input device, data is processed consistently by a data processing means belonging to the mobile information communication apparatus, and necessary information, such as an e-mail address or so on, is stored in a storage means such as a flash, which belongs to the mobile information communication apparatus. Herewith, even when a user comes back home or to a office from outside, he can smoothly continue his work, only by connecting the mobile information communication apparatus with an external display device and an external input device. Also it is not necessary to duplicates to manage data, as in the case both a mobile information communication apparatus and a PC is used.

Moreover, according to any one of the invention of the seventeenth and nineteenth invention of a mobile information communication apparatus, the effect to reduce wasteful use of resources is expected.

Function of a PC is rapidly upgraded corresponding mainly to version upgrade of OS and CPU and, as a result, a PC is replaced in interval of seven to ten years. On this occasion, it is usual to dispose of not only a PC package including mother board implemented with a CPU and memories but also a display device, full keyboard and an external storage device such as HDD (Hard Disk Drive).

In contrast, in the case that the invented mobile information communication apparatus is used in connection with an external display device and an external input device, since, in the first place, the mobile information communication apparatus is usable by itself, it is only necessary to replace the mobile information communication apparatus with the remainder being used as before, even when a CPU and other data processing means is revised to a higher-performance and former ones become obsolete. As a result, such amass disposal caused by replacement as in the case of a PC does not occur.

According to the twentieth or the twenty-first invention of a mobile information communication apparatus, a data processing means belonging to the mobile information communication apparatus can write data to or read out data from an external storage device, by connecting the external storage device to an interface means A3 of the mobile information communication apparatus. Herewith, contents, such as images downloaded from a web site, moving images recorded from TV broadcast, game programs and so on, and image files imaged by such imaging means as digital camera, digital video recorder and so on, are stored in the external storage device instead of a storage means belonging to the mobile information communication apparatus. And also, by using an external storage device for supplying application programs, such as CD-ROM (Compact Disc Read Only Memory) drive, DVD (Digital Versatile Disc or Digital Video Disc)-ROM drive, or so on, a user can copy application programs, which are stored in CD-ROM, DVD-ROM or so on, to a storage means belonging to the mobile information communication apparatus such as flash memory or so on and he can activates a data processing means by the application programs.

In a conventional mobile telephone unit, indeed, it is possible to copy contents file, such as image files acquired by communication means or imaging means, to a storage device belonging to a PC or so on by using a removable storage media such as a memory card. In this case, however, user must follow the following procedure: Contents files stored in a storage means belonging to a mobile telephone unit is copied to a removable storage media; The removable storage media is removed from the mobile telephone unit and then inserted into a media drive of a PC or so on: The contents files are copied to the storage media such as HDD by activating the HDD belonging to the PC.

In contrast, according to the twentieth or the twenty-first invention of a mobile information communication apparatus, since a data processing means of the mobile information communication apparatus can directly access an external storage device, it is possible to copy files directly from a storage means belonging to the mobile information communication apparatus to an external storage device.

According to any one of the twenty-second to the twenty-third invention of a mobile information communication apparatus, when a web page in web server connected to the Internet is browsed, or contents files such as image files, game programs or so on are acquired from a web server, images corresponding to the web page or contents files can be displayed on a screen of a high-resolution external display device, which is connected to an interface means A1 of the mobile information communication apparatus, in addition on a display panel belonging to the mobile information communication apparatus as before. On this occasion, additionally, a higher-resolution image with a higher resolution than the screen's resolution of the display panel belonging to the mobile information communication apparatus, without any constraint due to screen's resolution of display panel belonging to the mobile information communication apparatus.

Especially according to the twenty-third invention, in association with CGI (Common Gateway Interface) or PHP (Hypertext Preprocessor) function, such an "automatic sorting to a proper web site" function is realized as follows: When a destination assigning means of the invented mobile information communication apparatus assigns an interface means A1 as a destination of plotting command/data, that is, when a higher-resolution image is displayed on a high-resolution external display device, a web site, which, for example, includes web pages with a fixed-width layout of VGA or XGA, is accessed; Otherwise, that is, a image is displayed only on a display panel belonging to the mobile information communication apparatus, a web site, which is composed only by web pages with a liquid layout or fixed-width layout of small horizontal resolution.

According to the twenty-fourth invention of a mobile information communication apparatus, a moving image carried by a wireless moving image signal is displayed in real time on a screen of a high-resolution external display device connected to an interface means A1 of the invented mobile information communication apparatus, in addition on a display panel belonging to the mobile information communication apparatus. On this occasion, additionally, a higher-resolution image with a higher resolution than the screen's resolution of the display panel belonging to the mobile information communication apparatus, without any constraint due to screen's resolution of display panel belonging to the mobile information communication apparatus.

Also, a moving image carried by a wireless moving image signal is recorded and converted to a moving image data file. The moving image data file can be stored in a storage means belonging to the mobile information communication apparatus and is read out and played back later. On this occasion, a moving image can be played back not only on a display panel belonging to the mobile information communication apparatus but also on an external display with a higher resolution.

According to the twenty-fourth invention of a mobile information communication apparatus, a subject is imaged with the invented mobile information communication apparatus and a moving image of the subject is displayed in real time on a screen of a high-resolution external display device connected to an interface means A1 of the invented mobile information communication apparatus, in addition on a display panel belonging to the mobile information communication apparatus. On this occasion, a moving image can be played back not only on a display panel belonging to the mobile information communication apparatus but also on an external display with a higher resolution.

Also, a still image or a moving image, which is imaged by the mobile information communication apparatus, is converted to a data file. And the data file can be stored in a storage means belonging to the mobile information communication apparatus and is read out and played back later. On this occasion, a moving image can be played back not only on a display panel belonging to the mobile information communication apparatus but also on an external display with a higher resolution.

According to any one of the twenty-sixth to the twenty-eighth invention of a mobile information communication apparatus, markup document files and their linked files, which is acquired from a web server, or is stored in a storage means is processed and a page image corresponding to these files is displayed on a screen of a high-resolution external display device connected to an interface means A1 of the mobile information communication apparatus, in addition on a display panel belonging to the mobile information communication apparatus.

Especially, when a user connects to a web site for PC and browses a web page, which is intended to be browsed with a screen of, for example, VGA, by the mobile information communication apparatus, a whole page image is browsed not only on a display panel belonging to the mobile information communication apparatus by horizontally scrolling frequently but also, in a similar layout as a screen image on a PC, on a screen of a high-resolution external display device connected to an interface means A1 of the mobile information communication apparatus without any horizontal scrolling.

According to any one of the twenty-ninth to the thirty-second invention of a mobile information communication apparatus, an intrinsic image of said digital image signal or said image data file can be displayed on a screen of a high-resolution external display device connected to an interface means A1 of the mobile information communication apparatus. Especially, in the case that a resolution of an intrinsic image is higher than a screen's resolution of a display panel belonging to the mobile information communication apparatus, an intrinsic image can be displayed on a screen of a high-resolution external display device, although a whole image with a lower resolution generated by thinning out a part of the signal or the data or a part image.

Especially, according to the thirty-second invention of a mobile information communication apparatus, a map image including its present location information is displayed on a screen of a high-resolution external display device connected to an interface means A1 of the mobile information communication apparatus, in addition on a display panel belonging to the mobile information communication apparatus.

A navigation service using GPS is provided as a service for a mobile telephone unit, and, recently, so-called "NAVI for front-seat passenger" service has come to be provided, that provide with traffic jam information and traffic route information to a destination, in addition to normal navigation information. In the first place, however, a display devise belonging to a mobile telephone unit is so small that it is legally and practically impossible for a driver himself to browse map information because he has to hold a mobile telephone unit in front of his eyes. Therefore, this service is assumed that a front-seat passenger browses map information.

In contrast, according to the thirty-second invention of a mobile information communication apparatus, a driver himself can browse map information with his hand free, by placing a high-resolution external display device with a comparable size as that of a display panel part of a normal car navigation system to a comparable position as that of a normal car navigation system.

According to any one of the thirty-third to the thirty-sixth invention of a connection unit applied to a mobile information communication apparatus, by connecting a mobile information communication apparatus and a high-resolution external display device via the invented connection unit, the following merits can be gained, compared with the case of a direct connection of a mobile information communication apparatus and a high-resolution external display device.

Firstly, in a mobile information communication apparatus, a terminal part comprising an interface means A1 must be designed to be small and specially different from that which is commonly used for a PC and so on, because its portability is valued. By this reason, connection cable connected to the terminal part is also so special that it is difficult to prepare a variety of cables with different length, and, therefore, the positional relation between a mobile information communication apparatus and a high-resolution external display device positional relationship is naturally subjected to a restraint, if they are connected with each other directly by a connection cable.

In contrast, in the case that they are connected with each other via the invented connection unit, a mobile information communication apparatus and a high-resolution external display device are connected with each other comparatively freely by connecting an interface means A1, an interface means B1 and a high-resolution external display device as follows: An interface means A1 and an interface means B1 are connected with each other by a special cable; An interface means B2 and a high-resolution external display device are connected with each other by a commonly used cable, by making a terminal of an interface means B2 a commonly used terminal conforming a high-resolution external display device. As a result, a mobile information communication apparatus and a high-resolution external display device are placed in a free positional relation.

A mobile information communication apparatus and a high-resolution external display device are, indeed, connected not only by a connection cable but also by a wireless connection means. In such a case, however, securer communication, which can avoid the problem of approach range and obstacle of wireless communication, is realized by using the invented connection unit in as follows: An interface means A1 and an interface means B1 are connected with each other by wired connection means; An interface means B2 and a high-resolution external display device are connected with each other by wireless connection means. And vice versa is also possible.

Secondly, in the case that a mobile information communication apparatus is connected with an external input device, such as full keyboard, and/or an external storage device, such as HDD, in addition with a high-resolution external display device, a connection of a mobile information communication apparatus and an external devices can be simplified by using the invented connection unit as follows: At the side of a mobile information communication apparatus, a terminal comprising an interface means A1, a terminal comprising an interface means A2, and/or a terminal comprising an interface means A3 are unified; At the side of the invented connection unit, a terminal comprising an interface means B1, a terminal comprising an interface means B2, and/or a terminal comprising an interface means B3 are unified; Both of unified terminals are connected with each other.

And in this case, the invented connection unit connected with a mobile information communication apparatus is used in a similar image as using a desktop PC, by improving a connection between the mobile information communication apparatus and the connection unit in such a manner as follows: An external storage device such as HDD and DC power supply means such as AC/DC circuit, battery and so on is installed in a chassis comprising the invented connection unit; The chassis is also equipped with an insert slot, to which a mobile information communication apparatus is inserted to result in a connection of a terminal part of a mobile information communication apparatus and that of the invented connection unit by direct touch.

Note that the invented connection unit applied to a mobile information communication apparatus only takes only a role of an interface between a mobile information communication apparatus and external devices, and is not equipped with its own display data generating means to generate display data, separately from a data processing means belonging to a mobile information communication apparatus as the first type conventional technology described in "Background Art". Therefore, the problem of "irrational overlapping investment" and "inefficient resource use, which occurs in conventional technologies, does not occur.

According to any one of the thirty-eighth to the forty-fourth invention of an external input/output unit applied to a mobile information communication apparatus, by connecting and using the invented external input/output unit with a mobile information communication, the following merits can be gained, compared with the case that a mobile information communication apparatus and a high-resolution external display are connected with each other directly or via a connection unit.

Firstly, a connection of a mobile information communication apparatus and external devices can be simplified, because an interface means to a mobile information communication apparatus, an external display means and an external means such as a keyboard, and even an external storage means such as HDD are unified in to a chassis. A connection of a mobile information communication apparatus and both an external display means and an external input means can be simplified, especially in the following manner: At the side of a mobile information communication apparatus, a terminal comprising an interface means A1, a terminal comprising an interface means A2, and/or a terminal comprising an interface means A3 are unified; At the side of the invented external input/output unit, a terminal comprising an interface means D1, a terminal comprising an interface means D2, and/or a terminal comprising an interface means D3 are unified; Both of unified terminals are connected with each other.

And in this case, the invented external input/output unit connected with a mobile information communication apparatus is used in a similar image as using a notebook PC, by installing an external storage device such as HDD and a battery inside of a chassis comprising the invented external input/output unit and connecting the battery with an AC/DC circuit and commercial power supply plug.

Note that a mobile information communication apparatus and the invented external input/output unit are connected with each other by a special cable to results in a restraint in positional relationship because of the reason described in the description related to a connection unit applied to a mobile information communication apparatus. It is not serious problem, however, since mobile information communication apparatus and the invented external input/output unit are originally assumed to be used comparatively in a neighborhood because of notebook PC-like usage.

Especially according to the forty-first or the forty-fourth invention, a external input/output unit is made into a compact structure, since an external input means are installed in a external display panel belonging to an external input/output unit, and/or, in a frame part a external display panel. Therefore, it is convenient that a mobile information communication apparatus according to any one of seventeenth to the twenty-first invention and an external input/output unit according to the forty-first or the forty-fourth invention are combined and the combination is used as a car navigation system.

Note that in the case the combination of a mobile information communication apparatus according to any one of seventeenth to the twenty-first invention and a an external input/output unit according to the forty-first or the forty-fourth invention is used as a car navigation system, it is possible to construct car-mounted hands-free telephone call system can be constructed in the following manner: A mobile telephone unit with a telephone call function is used as a mobile information communication apparatus; An external input/output unit is equipped with an external speaker and an external microphone; A function to exchange sound data is added to an interface between a mobile information communication apparatus and an external input/output unit.

Figure 1:
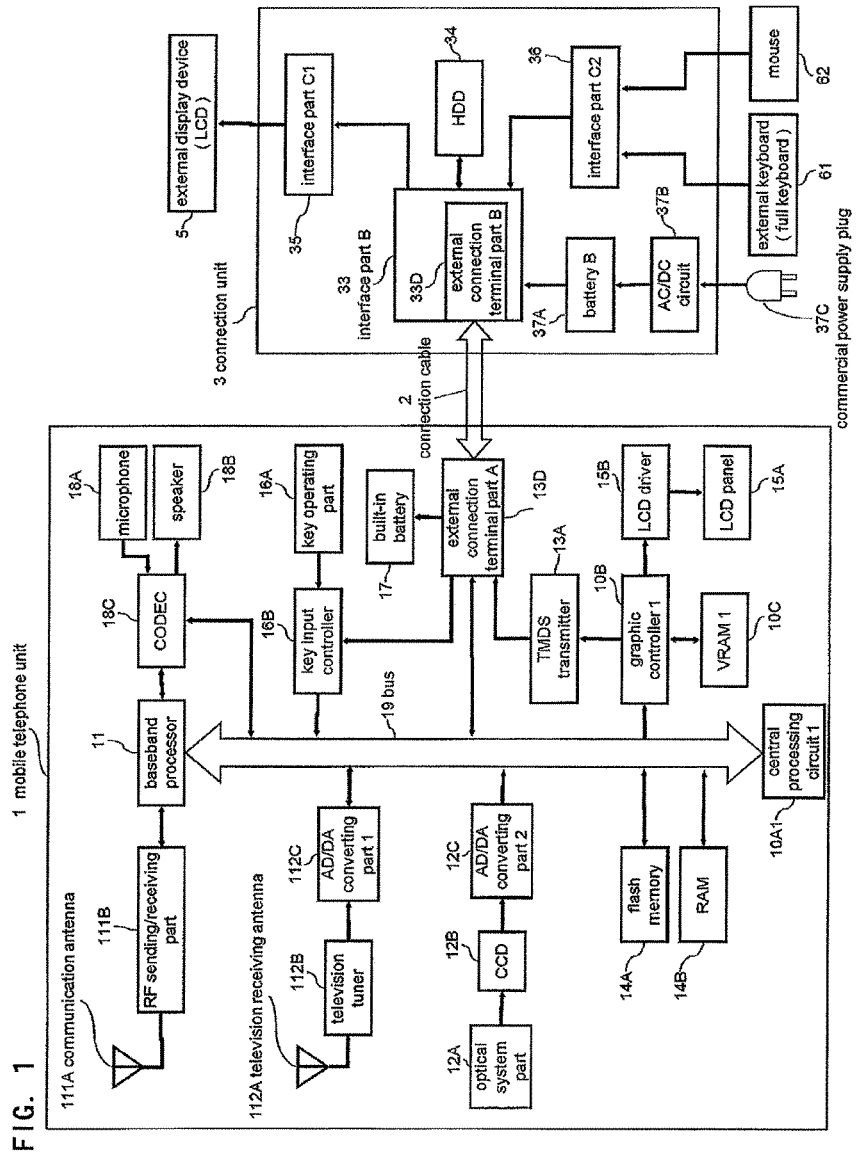
FIG. 1 is a block diagram showing a constitution and a function of the first embodiment of the present invention of a mobile information communication apparatus, a connection unit applied to a mobile information communication apparatus and an information communication system which is composed by connecting a mobile information communication apparatus and a connection unit and then connecting both of an external display device and external keyboard to a connection unit.

1 . . . mobile telephone unit
10A1 . . . central processing circuit 1
10A2 . . . central processing circuit 2
10B . . . graphic controller 1
10B1 . . . bit-mapped data generating circuit
10B2 . . . bit-mapped data transfer circuit
10C . . . VRAM 1
10D . . . plotting command transfer circuit
11 . . . baseband processor
111A . . . communication antenna
111B . . . RF sending/receiving part
112A . . . television receiving antenna
112B . . . television tuner
112C . . . AD/DA converting part 1
113A . . . shared antenna
113B . . . GPS down converter
113C . . . AD/DA converting part 3
113D . . . shared unit
12A . . . optical system part
12B . . . CCD
12C . . . AD/DA converting part 2
13A . . . TMDS transmitter
13B . . . graphic controller 2
13C . . . VRAM 2
13D . . . external connection terminal part A
14A . . . flash memory
14B . . . RAM
15A . . . LCD panel
15B . . . LCD driver
16A . . . key operating part
16B . . . key input controller
17 . . . built-in battery
18A . . . microphone
18B . . . speaker
18C . . . CODEC
19 . . . bus
2 . . . connection cable
3 . . . connection unit
33 . . . interface part B
33D . . . external connection terminal part B
33D1 . . . insertion slot
34 . . . HDD
35 . . . interface part C1
35A1 . . . RAMDAC
35A2 . . . video signal converting circuit
35D1 . . . VGA terminal part
35D2 . . . video output terminal part
36 . . . interface part C2
36D . . . external input connection terminal
37A . . . battery B
37B . . . AC/DC circuit
37C . . . commercial power supply plug
4 . . . external input/output unit
43 . . . interface part D
43D . . . external connection terminal part D
43D1 . . . insertion slot
44 . . . HDD
45A . . . external LCD panel
45B . . . external LCD driver
45C . . . scan converter
45D . . . TMDS receiver
456 . . . external LCD touch panel
461 . . . external key operating part
462 . . . external touchpad
47A . . . battery D
47B . . . AC/DC circuit
47C . . . commercial power supply plug
48A . . . external microphone
48B . . . external speaker
48C . . . external CODEC
5 . . . external display device
61 . . . external keyboard
62 . . . mouse
7 . . . outlet
8 . . . dashboard
9 . . . the Internet
91 . . . web server

BEST MODE FOR CARRYING OUT THE INVENTION

Hereinafter, embodiments of the present invention will be described with reference to the drawings. Note that the present invention is not restricted to the following embodiments and many variations are possible within the sprit and scope of the present invention.

Embodiment 1

FIG. 1 is a block diagram showing a constitution and a function of the first embodiment of the present invention of a mobile information communication apparatus, a connection unit applied to a mobile information communication apparatus and an information communication system which is composed by connecting a mobile information communication apparatus and a connection unit and then connecting both of an external display device and external keyboard to a connection unit, especially in the case that the mobile information communication apparatus is a mobile telephone unit.

In this embodiment, a mobile telephone unit 1 can be used by itself for telephone call, data communication and processing, TV program watching or subject imaging, and various images are displayed on an LCD (Liquid Crystal Display) panel 15, which is a display panel belonging to the mobile telephone unit 1. Hereinafter, it is assumed that screen's resolution of the LCD panel 15A is vertically long QVGA (horizontal×vertical=240×320 pixels) in usual use, but another screen's resolution is possible.

Firstly, when the mobile telephone unit 1 is used for telephone call, a sound picked up by microphone by a microphone 18A is converted to a digital signal by a CODEC (COder-DECoder) 18C and the digital signal goes through a baseband processor 11 and an RF (Radio Frequency) sending/receiving part 111B and is sent to public network as a wireless signal from a communication antenna 111A. In reverse, a wireless signal from public network is received by the communication antenna 111A and is converted to a digital signal by going through the RF sending/receiving part 111B and the baseband processor 11. The digital signal is converted to an analog electrical signal and is finally is outputted as sound from a speaker 18B.

Secondly, when the mobile telephone unit 1 is used for data communication and processing, data, which is inputted by operating a key operating part 16A composed of around twenty small keys and is converted to a digital signal by a key input controller 16B, and/or data, which is included in an wireless signal conforming to the Internet Protocol and received from public network, goes through the RF sending/receiving part 111B and the baseband processor 11 and is converted to the digital signal, are sent to a central processing circuit 1_10A1 via a bus 19. And then the central processing circuit 1_10A1 makes necessary processes on the data and sends the processed data to a RAM (Random Access Memory) 14B, a graphic controller 1_10B and the baseband processor 11 via the bus 19.

Note that sending and receiving of an wireless signal conforming to the Internet Protocol is realized by communicating with a base station of cellular network in the form such as CDMA (Code Division Multiple Access) or by communicating with a base station or an access point of wireless LAN in the form such as DSSS (Direct Sequence Spread Spectrum) and OFDM (Orthogonal Frequency Division Multiplexing).

Especially, when the mobile telephone unit 1 is connected to the Internet and a web page with a liquid layout or a narrow fixed-width layout including that belonging to "mobile site" is browsed, the central processing circuit 1_10A1 acquires markup document files and their linked files comprising the web page via the communication antenna 111A, the RF sending/receiving part 111B, the baseband processor 11 and the bus 19, according to browsing programs stored in a flash memory 14A. And said files are rendered into a page image, of which the number of horizontal pixels is equal to the screen's horizontal resolution of the LCD panel 15A (240 pixels), by the central processing circuit 1_10A1 and the central processing circuit 1_10A1 sends a plotting command of the rendered page image to the graphic controller 1_10B.

The graphic controller 1_10B generates bit-mapped data on a virtual screen, which is created so as to have a high enough resolution, and writes said data in a VRAM (Video RAM) 1_10C.

Hereinafter, the resolution of the virtual screen is assumed to be QUXGA Wide (Quad Ultra XGA Wide) (horizontal× vertical=3840×2400 pixels).

And then the graphic controller 1_10B cuts out a portion of the bit-mapped data describing an image which is displayed on the LCD panel 15A, and send the portion to an LCD driver 15B. Especially, in the case that the number of vertical pixels is larger than the screen's vertical resolution of the LCD panel 15A (320 pixels), the portion of the bit-mapped data moves on the virtual screen according to an operation of the key operating part 16A and a page image is scrolled.

The LCD driver 15B activates each pixel comprising the screen of the LCD panel 15A by activating a source driver part and a gate driver part according to the bit-mapped data and displays page image, in which menu bars are also displayed on the top and/or the bottom, corresponding to said web page.

When the mobile telephone unit 1 is used for TV program watching, a TV signal received by a television receiving antenna 112A is converted to a digital image signal by a television tuner 112B and an AD/DA converting part 1_112C, and the digital image signal is sent to the central processing circuit 1_10A1 via the bus 19.

On the other hand, in the mobile telephone unit 1, it is selectable by operating the key operating part 16A whether a TV broadcast image is displayed in the vertically long configuration or in the horizontally long configuration.

Note that screen's resolution is horizontal×vertical=240× 320 pixels in the vertically long configuration and horizontal×vertical=320×240 pixels in the horizontally long configuration.

The central processing circuit 1_10A1 generates a plotting command to generate a bit-mapped data of a screen image displayed on the LCD panel 15A according to said direction selection signal and said digital image signal and the plotting command to the graphic controller 1_10B.

Note that there can be nothing to be displayed at the top and/or the bottom of the screen in the vertically long configuration.

Since, in this case, horizontal and vertical resolution of an intrinsic image of TV broadcast are larger than those of the LCD panel 15A both in the vertically long configuration and in the horizontally long configuration, the central processing circuit 1_10A1 generates a plotting command of a whole image with an lower resolution than an intrinsic resolution by thinning out a part of the digital image signal sent from the AD/DA converting part 1_112C.

The graphic controller 1_10B, the VRAM 1_10C and LCD driver 15A move in the same manner as in the that case a page image of a web page is displayed, except that there is no screen scrolling according to the operation of the key operating part 16A, and, as a result, a moving image of TV broadcast is displayed on the LCD panel 15A in real time.

When the mobile telephone unit 1 is used for subject imaging, reflected or emitted light signal from a subject goes to a CCD 12B through an optical system part 12A including optical lens and is received and converted to an electrical signal of each pixel by the CCD 12B. The electrical signal is converted to a digital image signal by an AD/DA converting part 2_12C and then the digital image signal is sent to the central processing circuit 1_10A1 via the bus 19. Hereinafter, it is assumed that a resolution of the CCD 12B is UXGA (Ultra XGA) (horizontal×vertical=1600×1200 pixels), but another resolution is possible.

On the other hand, the central processing circuit 1_10A1, the graphic controller 1_10B, the VRAM 1_10C and LCD driver 15A move in the same manner as in the that TV program is watched and, as a result, a moving image of the subject is displayed in real time on the LCD panel 15A. Since, in this case, a horizontal and vertical resolution of an intrinsic image imaged by the CCD 12B are larger than those of the LCD panel 15A both in the vertically long configuration and in the horizontally long configuration, the central processing circuit 1_10A1 generates a plotting command of a whole image with an lower resolution than an intrinsic resolution by thinning out a part of the digital image signal sent from the AD/DA converting part 2_12C.

On the other hand, in the mobile telephone unit 1, by operating the key operating part 16A, a bit-mapped data, which is generated cooperatively by the central processing circuit 1_10A1 and the graphic controller 1_10B, can be stored as an image data file in the flash memory 14A. At that time, the bit-mapped data is stored in MPEG (Moving Picture Experts Group) format (including MPEG-1, MPEG-2, MPEG-4) in the case of moving image, and is stored in such format as BMP, TIFF, JPEG, GIF and PNG. Note that an image file is also generated and stored in the case that the central processing circuit 1_10A1 receives and make necessary processes on a digital signal, which is received via the communication antenna 111A, the RF sending/receiving part 111B and the baseband processor 11 by accessing a web site.

The central processing circuit 1_10A1 can access the image data stored in the flash memory 14A via the bus 19. And when the central processing circuit 1_10A1 processes the readout data properly and the graphic controller 1_10B, the VRAM 1_10C and LCD driver 15A move in the same manner as described above, the corresponding image is also displayed on the LCD panel 15A.

Hereinbefore, described is the outline of the function of the mobile telephone unit 1 when it is used by itself. In addition to use by itself, the mobile telephone unit 1 and a connection unit 3 can be made work as an unified information communication system by connecting an external connection terminal part A_13D, which is belong to the mobile telephone unit 1 to connect itself to the connection unit 3, and external connection terminal B_33D comprising an interface part B_33, which is belong to the connection unit 3 via a connection cable 2.

On the other hand, the connection unit 3 is equipped with an interface part C1_35 and interface part C2_36, both of which are interface means to connect external apparatuses. An the external display device 5, which is LCD, is connected to the interface part C1_35, and an external keyboard 61, which is a full keyboard, and a mouse 62 is connected to an interface part C2_36, respectively. Also, the connection unit 3 is equipped with an HDD 34 and a battery B_37A, both of which are connected to interface part B. The battery B_37A is connected with an AC/DC circuit 37B and a commercial power supply plug 37C and the connection unit 3 is made to work by DC power which is once stored in the battery B 37A via them. Note that DC power supply, which is stored in the battery B 37A belonging to the connection unit 3, is also supplied to and stored in a built-in battery 17 belonging to telephone unit 1 via an external connection terminal part B_33D and the external connection terminal part A 13D, and the mobile telephone unit 1 is made to work by the DC power.

Hereinafter, it is assumed that a screen's resolution of the external display device 5 (LCD) is VGA (horizontal×vertical=640×480 pixels) in principle, but another resolution is possible.

When the mobile telephone unit 1 in work and the connection unit 3 are connected with each other, or when the mobile telephone unit 1 in work and the connection unit 3 are connected with each other, and then the connection unit 3 is made to work, or when the mobile telephone unit 1 and the connection unit 3 in work are connected with each other, and then the mobile telephone unit 1 is made to work, the central processing circuit 1_10A1 of the mobile telephone unit 1 receives a connection detection signal of the connection unit 3 from the connection unit 3 and screen's resolution data of the external display device 5 via the external connection terminal part B 33D, the external connection terminal part A 13D and the bus 19.

Hereinbefore and hereinafter, "signal which detects one to be connected" is referred as "one's connection detection signal".

When the central processing circuit 1_10A1 of the mobile telephone unit 1 detects said connection detection signal, the central processing circuit 1_10A1 generates a plotting command of an image with a higher resolution and send it to the graphic controller 1_10B, instead of a plotting command of an image of which horizontal resolution or resolution is the same as the screen's horizontal resolution or the screen's resolution of the LCD panel 15A.

More concretely, when a web page for PC is browsed with the mobile telephone unit 1, the central processing circuit 1_10A1 generates and sends a plotting command manner corresponding to layout of the web page, according to browser software stored in the flash memory 14A, in the following manner: When the web page is with a liquid layout or a fixed-width layout narrower than screen's horizontal resolution of the external display device 5 (480 pixels), the central processing circuit 1_10A1 generates and sends a plotting command of a page image with the same horizontal resolution as the screen's horizontal resolution of the external display device 5. And when the web page is with a fixed-width layout wider than screen's horizontal resolution of the external display device 5 (480 pixels), the central processing circuit 1_10A1 generates and sends a plotting command of a page image with the same horizontal resolution as the fixed-width.

On the other hand, when TV broadcast is watched or a subject is imaged with the mobile telephone unit 1, the central processing circuit 1_10A1 generates and sends a plotting command of a whole image corresponding to the screen's resolution of the external display device 5 by thinning out a part of the digital image signal.

And the central processing circuit 1_10A1 generates a sending command to send bit-mapped data cut out from the VRAM 1_10C to a TMDS transmitter 13A instead to the LCD driver 15B and sends the sending command to the graphic controller 1_10B.

Note that, in the case a web page with fixed-layout is browsed with a connected external display devise such as full high-vision TV monitor (horizontal×vertical=1920×1080 pixels), of which screen's resolution is high enough but lower than the logical resolution of the previously created virtual screen (3840×2400 pixels), the central processing circuit 1_10A1 generates and sends a plotting command of a page image with the same horizontal resolution of the screen's horizontal resolution of the external display device 5, because the width of almost all the web page does not exceed the screen's horizontal resolution of the external display device 5.

Also, in the case TV broadcast is watched or a subject is imaged with a connected external display devise such as full high-vision TV monitor, the central processing circuit 1_10A1 generates and sends a plotting command of an intrinsic image of a digital image signal, because the resolution of the intrinsic image does not exceed the screen's horizontal resolution of the external display device 5.

The graphic controller 1_10B generates bit-mapped data on the previously created virtual screen and writes it in the VRAM 1_10C according to the plotting command received from the central processing circuit 1_10A1. And then the graphic controller 1_10B cuts out bit-mapped data describing an image displayed on the screen of the external display device 5, of which resolution is the same as the screen's resolution of the external display device 5, from the VRAM 1_10C, according to screen's resolution data of the external display device 5, which is received from the central processing circuit 1_10A1, and sends the bit-mapped data to the TMDS transmitter 13A. The TMDS transmitter 13A sends the bit-mapped data to the interface part B 33 of the connection unit 3 via the external connection terminal part A 13D in TMDS format.

In the connection unit 3, the interface part C1_35 with TMDS receiver function receives, makes necessary processes on the bit-mapped data and sends it to the external display device 5, and an image with a resolution corresponding to the screen's resolution is displayed on the screen of the external display device 5 as a result. On this occasion, horizontal whole of a page image is displayed without any horizontal scrolling in the case that a web page with a liquid layout or a fixed-width layout narrower than the screen's horizontal resolution of the external display device 5 is browsed. In the case, however, that a web page with a fixed-width layout wider than the screen's horizontal resolution of the external display device 5 is browsed, only a horizontal portion of page image is displayed on the screen of the external display device 5 and a whole image can be browsed by horizontal scrolling. On the other hand, in the case TV broadcast is watched or a subject is imaged, an image with a lower resolution than the intrinsic image of the digital image signal is displayed in full screen on the screen of the external display device 5.

Note that in the case such a high-resolution display device as a full high-vision TV monitor is selected as the external display device 5 and a web page is browsed with the external display device 5 connected, a horizontal whole of a page image is browsed without any horizontal scrolling in almost all the cases because of the reason described above.

On the other hand, also, when TV broadcast is watched or a subject is imaged with the external display device 5, which is a high-resolution display device as a full high-vision TV monitor, an intrinsic image is displayed, corresponding that the central processing circuit 1_10A1 generates and sends a plotting command of an intrinsic image of a digital image signal. Especially, in the case that the external display device 5 or the interface part C1_35 of the connection unit 3 has an upscan function, the intrinsic image is displayed in full screen on the screen of the external display device 5. Especially, in the case that the upscan function accompanies a pixel interpolation function, a fine screen image with the same resolution as the screen's resolution of the external display device 5.

When the central processing circuit 1_10A1 of the mobile telephone unit 1 receives said connection detection signal, the central processing circuit 1_10A1 send a source assigning signal to the key input controller 16B, which commands it not to receive an input signal from the key operating part 16A of the central processing circuit 1_10A1 and to receive an input signal from the external keyboard 61 connected to the interface part C2_36 of the connection unit 3. Owing to this function, a user can input data by operating the external keyboard 61, which is a full keyboard, instead by operating the key operating part 16A of the mobile telephone unit 1, of which operationality of character input is bad.

And the central processing circuit 1_10A1 of the mobile telephone unit 1 can read out a data file stored in the flash memory 14A according to a key operation of keyboard 61 and can store it in the HDD 34 via the bus 19, the external connection terminal part A 13D, and the interface part B 33 of the connection unit 3.

Note that a destination of bit-mapped data generated by the graphic controller 1_10B and a input source of data sent to the central processing circuit 1_10A1 can be assigned or changed, for example, by manually operating the key operating part 16A of the mobile telephone unit 1 as well as automatically assigned or changed according to a connection detection signal received by the central processing circuit 1_10A1. And a resolution of an image described by a bit-mapped data sent to the external display device 5 can be assigned, for example, by manually selecting the resolution conforming to the screen's resolution of the external display device 5 from the choice list of resolutions, of which image is displayed on the LCD panel 15A or on the screen of the external display device 5 as well as automatically assigned according to screen's resolution data of the external display device 5 which is received by the central processing circuit 1_10A1. Also a resolution of an image described by a bit-mapped data sent to the external display device 5 can be fixed, for example, to VGA with no choice.

Figure 2:
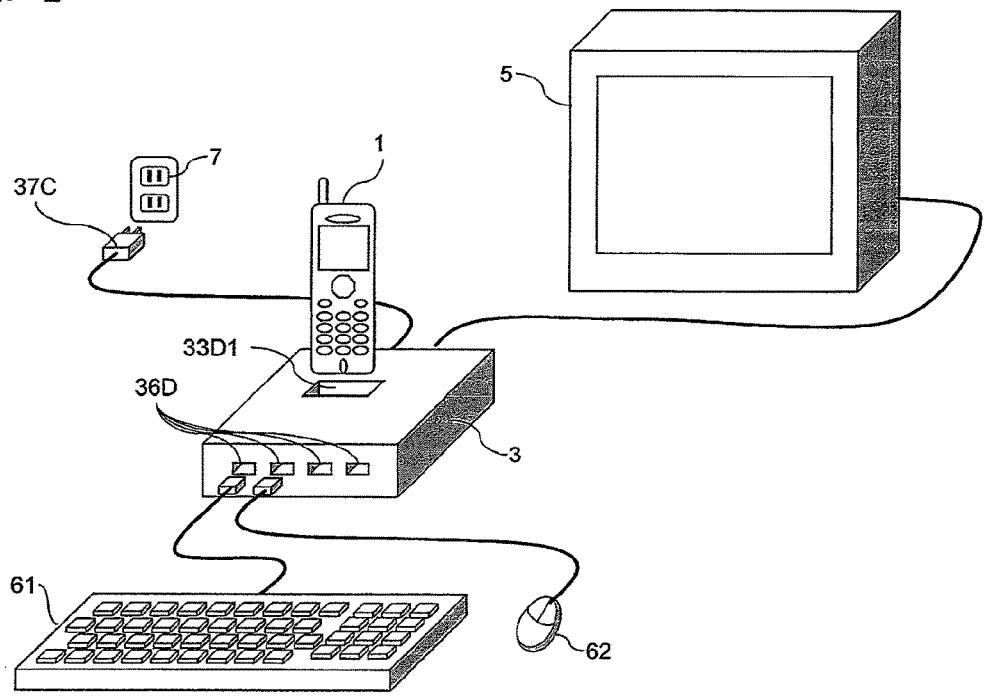
FIG. 2 is an outline diagram showing a constitution of the first embodiment of the present invention of an information communication system which is composed by connecting a mobile information communication apparatus and a connection unit applied to a mobile information communication apparatus and then connecting both of an external display device and external keyboard to a connection unit.

On the other hand, FIG. 2 is an outline diagram showing a constitution of the first embodiment of the present invention of an information communication system which is composed of connecting a mobile information communication apparatus and a connection unit applied to a mobile information communication apparatus and then connecting both of an external display device and external keyboard to a connection unit, especially in the case that the mobile information communication apparatus is a mobile telephone unit.

In this embodiment, the connection unit 3 is equipped with an insertion slot 33D1, into which the mobile telephone unit 1 is inserted. By inserting the mobile telephone unit 1 to the insertion slot 33D1, the external connection terminal part A 13D of the mobile telephone unit 1, which is not shown in FIG. 2, and the interface part B 33 of the connection unit 3, which is not shown in FIG. 2, become in touch, and, as a result, the mobile telephone unit 1 and the connection unit 3 are connected with each other. Therefore, the connection cable 2 is dispensable in this embodiment.

And the connection unit 3 is also equipped with an external input connection terminal 36D for connecting the external keyboard 61 and the mouse 62. By inserting a connection cable connector for the external keyboard 61 and a connection cable connector for the mouse 62, these input devices can be connected to the connection unit 3. And the connection unit 3 is also equipped with a connection terminal for connecting the external display device 5, which is not shown in FIG. 2. By connecting a connection cable connector for the external display device 5 with said connection terminal and a connection terminal of the external display device 5, which is not shown in FIG. 2, the external display device 5 can be connected to the connection unit 3.

Note that connectors and connection cable are purchased cost-effectively by making interface of the connection unit 3 between the external display device 5 and external input devices (the external keyboard 61 and the mouse 62) conform to commonly used standard such as DVI (Digital Visual Interface) and USB (Universal Serial Bus).

Connection unit 3 is also equipped with the commercial power supply plug 37C and, by inserting the commercial power supply plug 37C into an outlet 7 of commercial AC power, the connection unit 3 can be activated and built-in battery of the mobile telephone unit 1, which is not shown in FIG. 2, is charged via AC/DC circuit built in the connection unit 3, which is not shown in FIG. 2.

Note that although the mobile telephone unit 1 and the connection unit 3, the connection unit 3 and the external display device 5, and, the connection unit 3 and external input devices (the external keyboard 61 and the mouse 62) are connected with each other by connection cable or by direct touch of external connection terminal parts, they can be connected by wireless means such as Bluetooth and IrDA (Infrared Data Association) instead.

Figure 3:
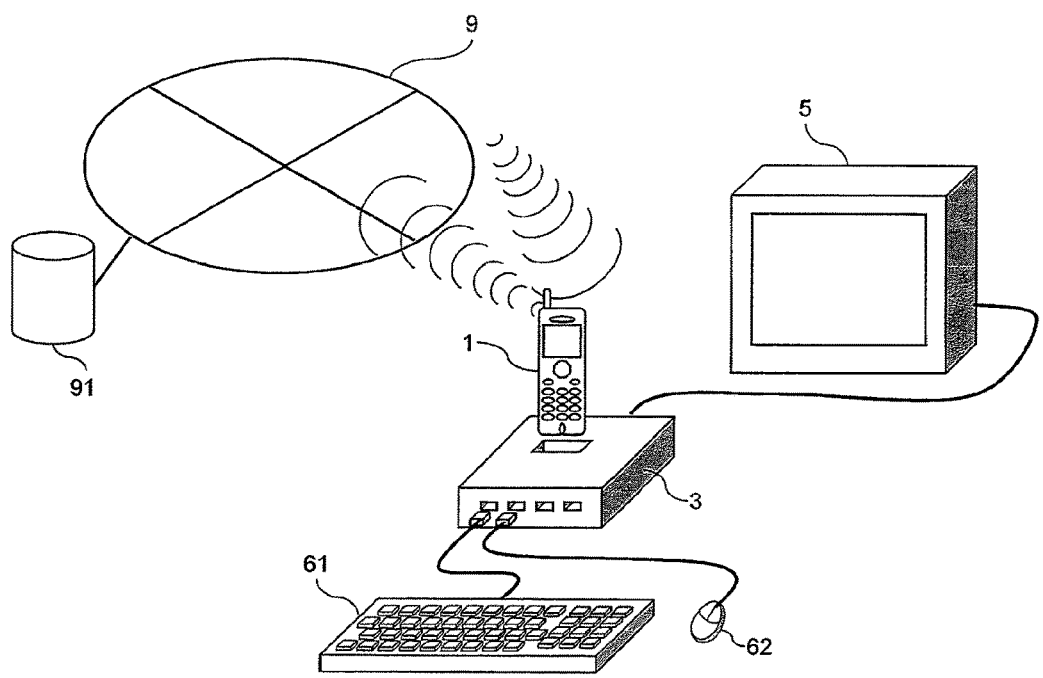
FIG. 3 is an explanation diagram showing an exchange of information between the first embodiment of the present invention of an information communication system, which is composed by connecting a mobile information communication apparatus and a connection unit applied to a mobile information communication apparatus and then connecting both of an external display device and external keyboard to a connection unit, and a web server connected to the Internet.

On the other hand, FIG. 3 is an explanation diagram showing an exchange of information between the first embodiment of the present invention of an information communication system, which is composed of connecting a mobile information communication apparatus and a connection unit applied to a mobile information communication apparatus and then connecting both of an external display device and external keyboard to a connection unit, and a web server connected to the Internet, especially in the case that the mobile information communication apparatus is a mobile telephone unit.

When an information communication system composed of the mobile telephone unit 1, the connection unit 3, the external display device 5 and external input devices (the external keyboard 61 and the mouse 62) accesses a web server 91 connected to the Internet 9, the central processing circuit 1_10A1 sends user-agent information to the web server 91 via the bus 19, the baseband processor 11, the RF sending/receiving part 111B and the communication antenna 111A, according to browser software stored in the flash memory 14A. Note that components installed inside of the mobile telephone unit 1 are not shown in FIG. 3.

On this occasion, the central processing circuit 1_10A1 makes the user-agent information include information, which specifies whether the central processing circuit 1_10A1 commands the graphic controller 1_10B to send bit-mapped data cut out from the VRAM 1_10C to the LCD driver 15B or to the TMDS transmitter 13A.

The web server 91 stores both "a set of data files for mobile" and "a set of data files for PC".

Hereinbefore and hereinafter, "a set of data files corresponding to web pages which is intended to be browsed with a display means belonging to a mobile telephone unit and is of small size without frame layout" is referred as "a set of data files for mobile", and "a set of data files corresponding to web pages which has no restriction on size and layout" is referred as "a set of data files for PC".

Since the web server 91 has a CGI function or a PHP function, the web server 91 selects a preferable set of data files and sends it to an information communication system composed of the mobile telephone unit 1, the connection unit 3, the external display device 5 and external input devices (the external keyboard 61 and the mouse 62) in the following manner: "A set of data files for mobile" is sent in the case that a sending command from the central processing circuit 1_10A1 commands to send to the LCD driver 15B, and "a set of data files for PC" in the case that a sending command commands to send to the TMDS transmitter 13A.

As a result, with an information communication system composed of the mobile telephone unit 1, the connection unit 3, the external display device 5 and external input devices (the external keyboard 61 and the mouse 62), preferable web pages, which corresponds to a screen's resolution of the display panel in an active condition, can be browsed.

Note that browser software stored in the flash memory 14A of the mobile telephone unit 10 has a rendering function, by which a screen image can be generated from several markup files comprising a web page with a frame layout. Herewith, the central processing circuit 1_10A1 can generate and send a plotting command of a web page with a frame layout.

Figure 4:
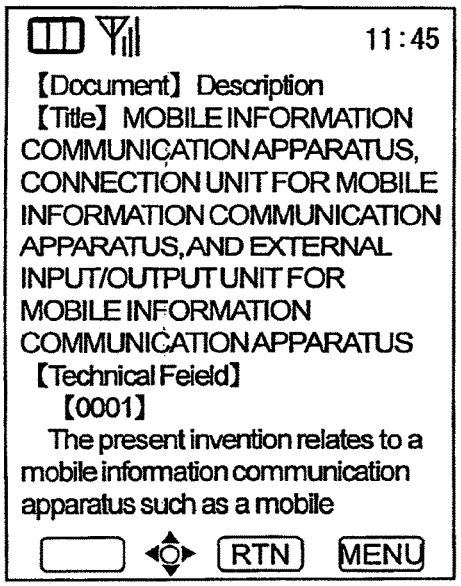
FIG. 4 is an image showing a screen image, which is displayed on a display panel belonging to the first embodiment of the present invention of a mobile information communication apparatus, when a markup document file with a liquid layout is browsed with the mobile information communication apparatus.
Figure 5:
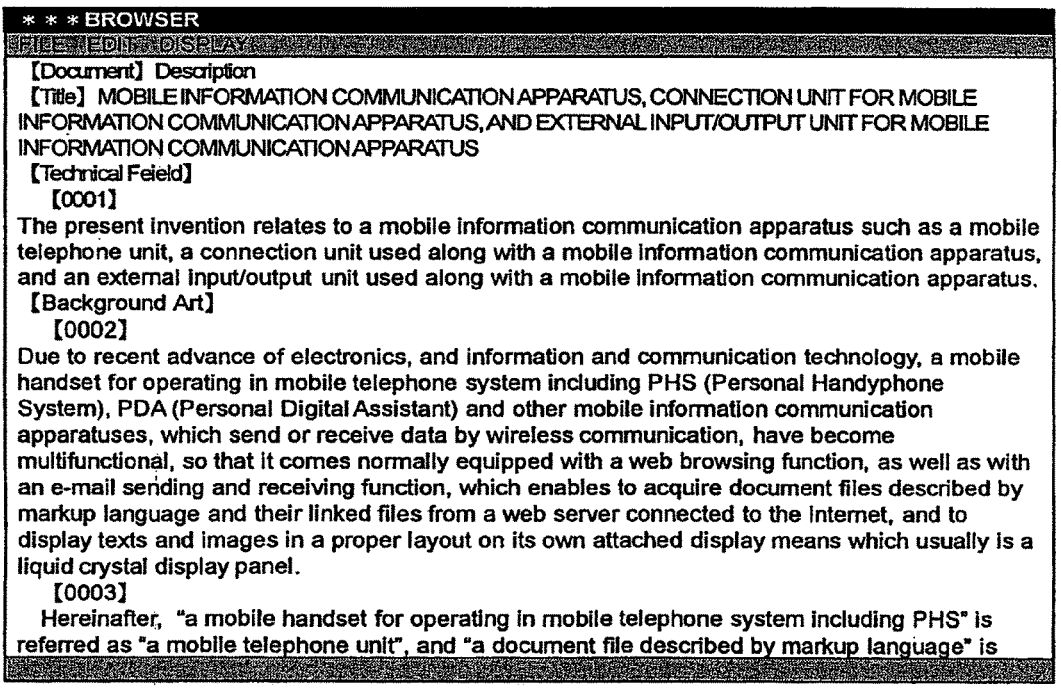
FIG. 5 is an image showing a screen image which is displayed on a screen of an external display device, when a markup document file with a liquid layout is browsed with the first embodiment of the present invention of an information communication system which is composed by connecting a mobile information communication apparatus and a connection unit applied to a mobile information communication apparatus and then connecting both of an external display device and external keyboard to a connection unit.

On the other hand, FIG. 4 is an image showing a screen image which is displayed on a display panel belonging to the first embodiment of the present invention of a mobile information communication apparatus, when a markup document file with a liquid layout is browsed by the mobile information communication apparatus, and FIG. 5 is an image showing a screen image which is displayed on a screen of an external display device, when a markup document file with a liquid layout is browsed by the first embodiment of the present invention of an information communication system which is composed by connecting a mobile information communication apparatus and a connection unit applied to a mobile information communication apparatus and then connecting both of an external display device and external keyboard to a connection unit. Note that FIG. 4 and FIG. 5 show the case a markup document file, which describes Japanese description of the present application without change, is browsed.

When markup document file with a liquid layout either with the LCD panel 15A of the mobile telephone unit 1, of which screen's resolution is assumed to be QVGA, or with an external display device, of which screen's resolution is assumed to be VGA, no horizontal scrolling is required because text automatically moves to next line corresponding to a screen's horizontal width. However, as shown in FIG. 4, since number of characters in a line displayed on the LCD panel 15A is small, it is required to roll down frequently to result in difficulty in understanding whole text. In contrast, since number of characters in a line displayed on a screen of an external display device is large, it is very easy to understand whole text, as shown in FIG. 5.

Embodiment 2

Figure 6:
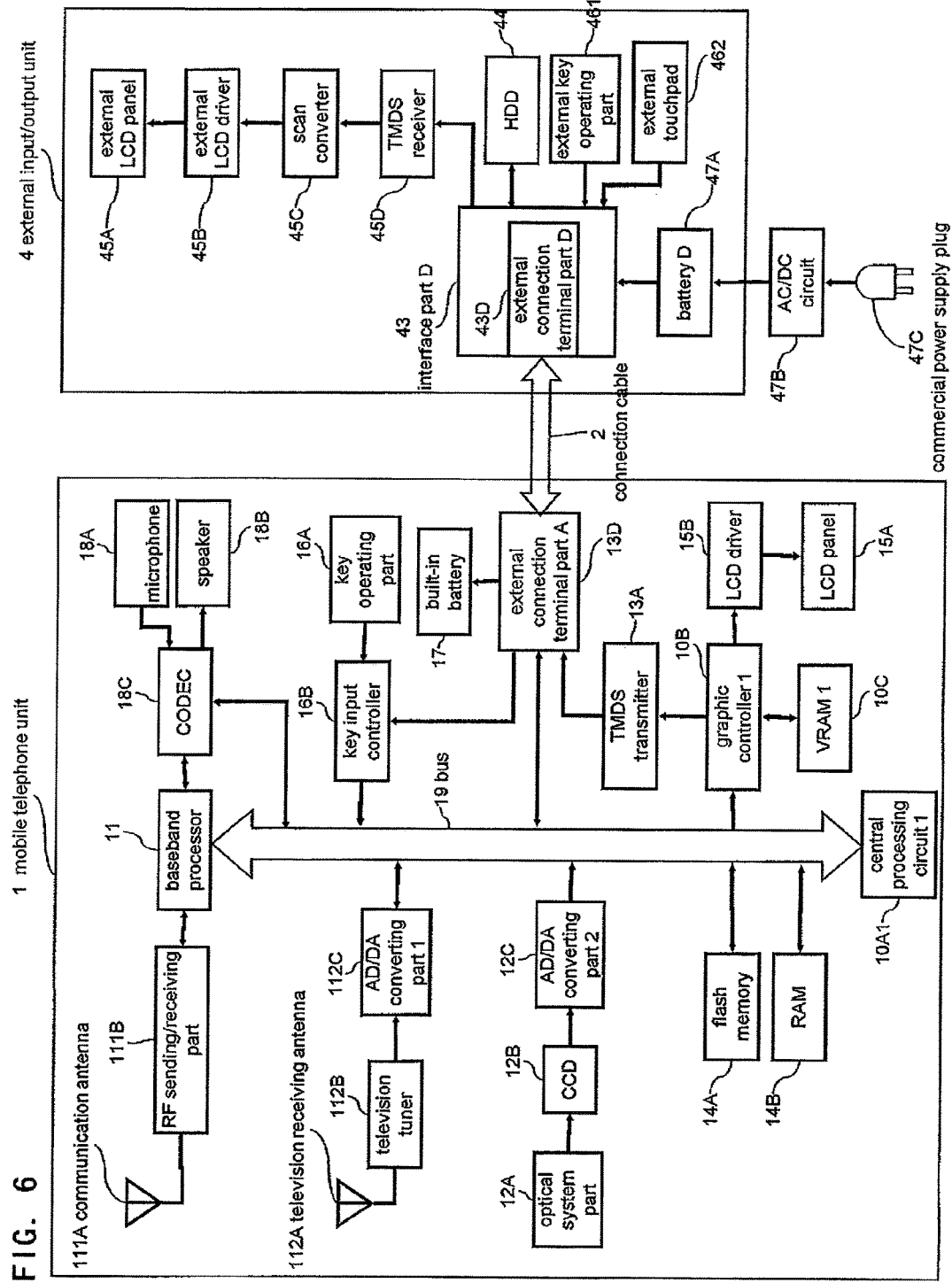
FIG. 6 is a block diagram showing a constitution and a function of the second embodiment of the present invention of an information communication system, which is composed by connecting a mobile information communication apparatus, and an external input/output unit applied to a mobile information communication apparatus.

FIG. 6 is a block diagram showing a constitution and a function of the second embodiment of the present invention of an information communication system which is composed by connecting a mobile information communication apparatus and an external input/output unit applied to a mobile information communication apparatus, especially in the case that the mobile information communication apparatus is a mobile telephone unit.

Functions of this embodiment of the mobile telephone unit 1 is the same as that of the first embodiment of the mobile telephone unit 1 in the case the mobile telephone unit 1 is used by itself. On the other hand, the mobile telephone unit 1 is connected to an external input/output unit 4, instead of a connection unit, via the connection cable 2. Also in this case, fundamental functions of the mobile telephone unit 1 is the same as that of the first embodiment, expect that the central processing circuit 1_10A1 receives the screen's resolution data of an external LCD panel 45A belonging to the external input/output unit 4 instead of a screen's resolution data of an external display device On the other hand, functions of the external input/output unit 4 is almost the same as the combination of the first embodiment of the connection unit 3 and the external display device 5 and external input devices, except the followings: An external display device and external keyboard are not externally connected, and the external LCD panel 45A and an external key operating part 461 are included in the external input/output unit 4 as its components instead; A mouse is not externally connected, and the external input/output unit 4 is equipped with an external touchpad 462 instead.

The central processing circuit 1_10A1 of the mobile telephone unit 1, that is to say, commands the graphic controller 1_10B to generate bit-mapped data describing an image with a proper resolution for each case and send it to the TMDS transmitter 13A, when the central processing circuit 1_10A1 receives a connection detection signal of the external input/output unit 4 and screen's resolution data of the external LCD panel 45A belonging to the external input/output unit 4. The bit-mapped data, which is sent by the graphic controller 1_10B according to the plotting command the sending command, is received by an external connection terminal part D_43D comprising an interface part D_43 of the external input/output unit 4 via the external connection terminal part A 13D of the mobile telephone unit 1. The bit-mapped data, on which necessary processes are made by a TMDS receiver 45D and a scan converter 45C, is sent to an external LCD driver 45B, and then the external LCD driver 45B activates each pixel comprising the screen of the external LCD panel 45A so that screen image is displayed on the external LCD panel 45A.

Figure 7:
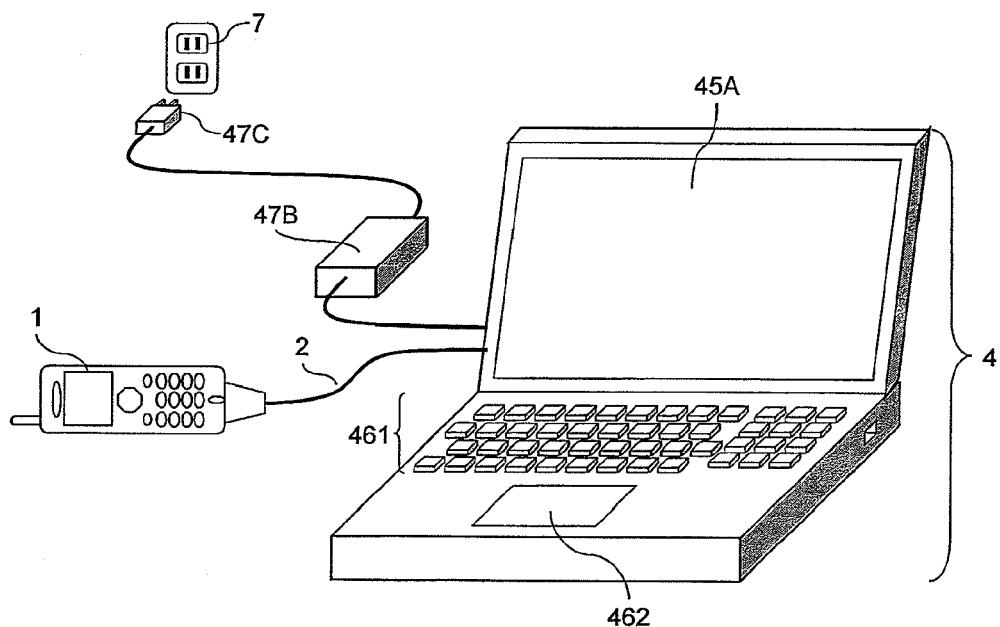
FIG. 7 is an outline diagram showing a constitution of the second embodiment of the present invention of an information communication system, which is composed by connecting a mobile information communication apparatus, and an external input/output unit applied to a mobile information communication apparatus.

On the other hand, FIG. 7 is an outline diagram showing a constitution of the second embodiment of the present invention of an information communication system which is composed by connecting a mobile information communication apparatus and an external input/output unit applied to a mobile information communication apparatus, especially in the case that the mobile information communication apparatus is a mobile telephone unit.

In this embodiment, the external input/output unit 4 is constructed as follows: circuits such as that comprising the interface part D 43, the TMDS receiver 45D, the scan converter 45C and an HDD 44, which are not shown in FIG. 7, are installed inside of a chassis, on the top surface of which the external key operating part 461 and the external touchpad 462 are equipped; The chassis and the external LCD panel 45A are hinged; the external LCD driver 45B, which is not shown in FIG. 7, is installed in a frame part of LCD panel 45A; the external connection terminal part D 43D to connect the connection cable 2 and a terminal part to connect a power cable connected to an AC/DC circuit 47B are installed on the back side surface of the chassis, which is not shown in FIG. 7.

Embodiment 3

Figure 8:
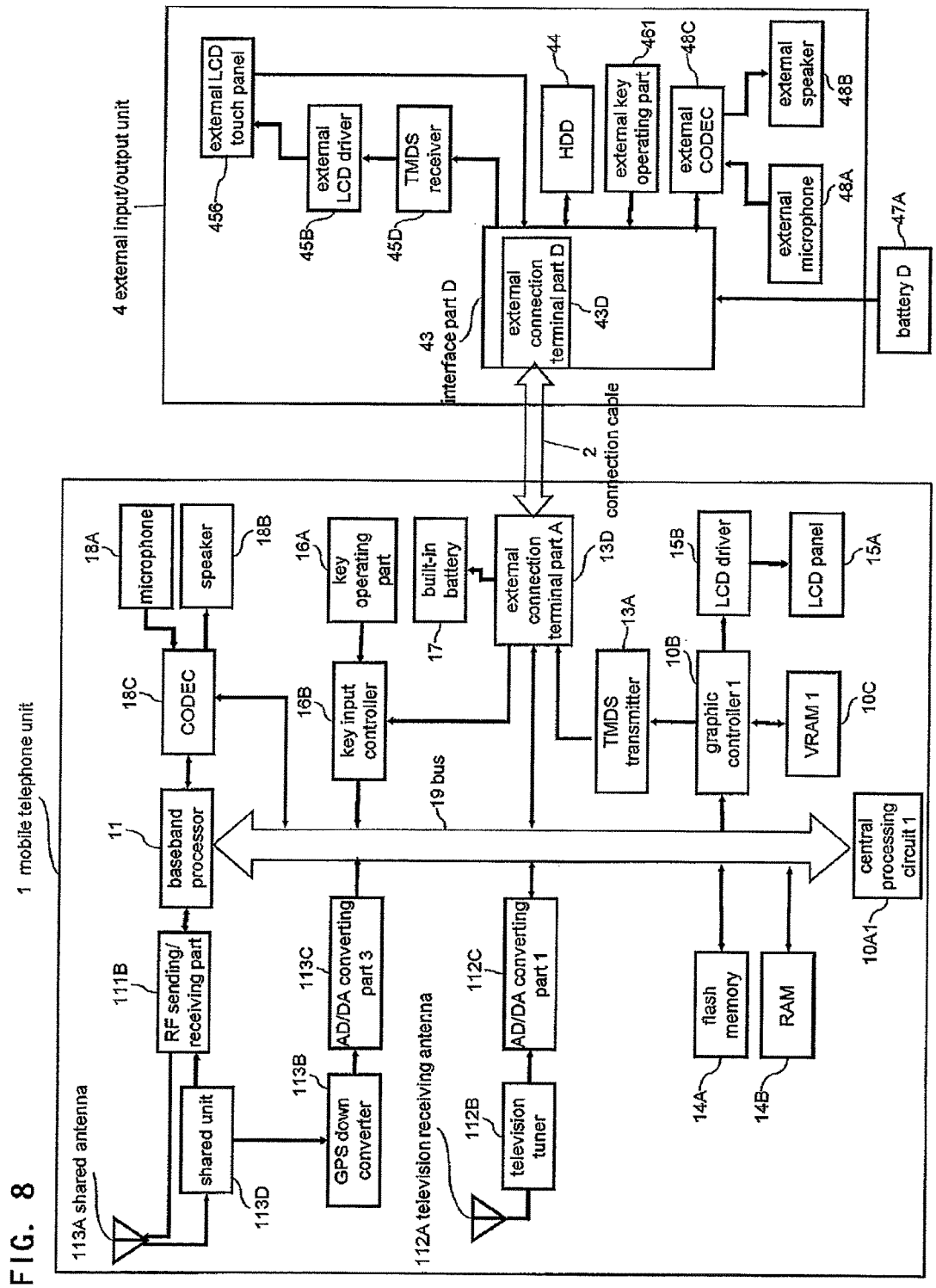
FIG. 8 is a block diagram showing a constitution and a function of the third embodiment of the present invention of a navigation system, which is composed by connecting a mobile information communication apparatus, and an external input/output unit applied to a mobile information communication apparatus.

FIG. 8 is a block diagram showing a constitution and a function of the third embodiment of the present invention of a navigation system which is composed by connecting a mobile information communication apparatus and an external input/output unit applied to a mobile information communication apparatus, especially in the case that the mobile information communication apparatus is a mobile telephone unit.

In this embodiment, the mobile telephone unit 1 is equipped with: a shared antenna 113A which receives a GPS signal, in addition to a communication wireless signal, and converts it to an electrical signal; a shared unit 113D which sends the electrical signal converted from the a communication wireless signal to the RF sending/receiving part 111B and sends the electrical signal converted from the GPS signal to an aftermentioned GPS down converter 113B respectively; a GPS down converter 113B which convert a frequency of the electrical signal converted from the GPS signal; an AD/DA converting part 3_113C which converts the frequency-converted electrical signal to a digital signal. Note that it is not equipped with imaging means such as a CCD.

Hereinafter and hereinbefore, "wireless signal for data communication and telephone call" is referred as "communication wireless signal".

The central processing circuit 1_10A1 acquires image data, which includes map information by accessing the HDD 44, which is equipped to the external input/output unit 4, and reading out the image data file stored in the HDD 44 or by receiving a wireless signal conforming the Internet Protocol. And the central processing circuit 1_10A1 sends a plotting command to the graphic controller 1_10B in real time, which commands to generate bit-mapped data describing a map image including its present location information on the virtual screen with high enough resolution by coupling the map information with the digital signal from the AD/DA converting part 3_113C.

At that time, the central processing circuit 1_10A1 sends a sending command, which commands to send the generated bit-mapped data whether to the LCD driver 15B or to TMDS transmitter 13, to the graphic controller 1_10B, according to the connection detection signal which detects the external input/output unit 4 to be connected.

According to the sending command, the graphic controller 1_10B cuts out a portion of bit-mapped data on the virtual screen, which corresponds to the screen's resolution of LCD panel 16A or the screen's resolution of an external LCD touch panel 456 belonging to the external input/output unit 4, and sends it to the LCD driver 15B or the TMDS transmitter 13A respectively. And a map image, in the center of which its present location is there and menu bars are also displayed on the top and/or the bottom, is displayed in full screen on LCD panel 16A of the mobile telephone unit 1 or on the external LCD touch panel 456 of the external input/output unit 4

Note that the external LCD touch panel 456 belonging to this embodiment of the external input/output unit 4 has a touch panel function which enables for a user to input data by touching a surface of the panel, and data inputted by touching the panel of the external LCD touch panel 456 is sent to the central processing circuit 1_10A1 via the interface part D 43, the external connection terminal part A 13D and the bus 19, in action to data inputted by operating the external key operating part 461. And these data are processed by the central processing circuit 1_10A1 and images displayed on the external LCD touch panel 456 are changed as a result.

The external input/output unit 4 is also equipped with an external microphone 48A, an external speaker 48B and an external CODEC 48C. These components exchange signals between the baseband processor 11, and telephone call by using the external microphone 48A and the external speaker 48B and voice output of traveling route information are realized as a result.

Figure 9:
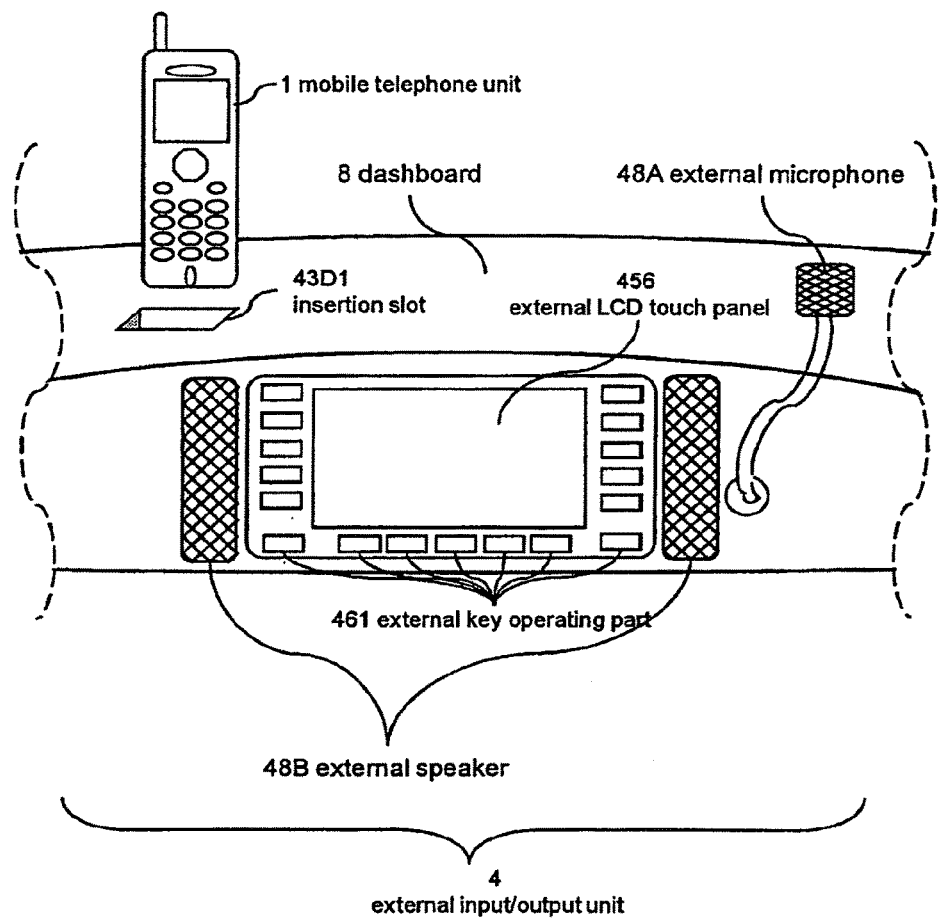
FIG. 9 is an outline diagram showing a constitution of the third embodiment of the present invention of a navigation system, which is composed by connecting a mobile information communication apparatus, and an external input/output unit applied to a mobile information communication apparatus.

FIG. 9 is an outline diagram showing a constitution of the third embodiment of the present invention of a navigation system, which is composed by connecting a mobile information communication apparatus, and an external input/output unit applied to a mobile information communication apparatus, especially in the case that the mobile information communication apparatus is a mobile telephone unit.

In this embodiment, chassis, at the top surface of which the external LCD touch panel (display unit) 456 with the external key operating part 461 around itself is equipped, is mounted at the driver's side of a dashboard 8, and the HDD 44 and circuits comprising a variety of interfaces are installed inside of the chassis. Note that the HDD 44 and circuits comprising a variety of interfaces (such as a first interface device comprising the connection cable 2 in FIG. 8 and a second interface device comprising the interface part D 43 in FIG. 8) are not shown in FIG. 9. Also the external connection terminal part D (cradle) 43D is installed on the side surface or on the bottom surface of the chassis, which is mounted inside of the dashboard 8, and the external connection terminal part D 43D, and the external connection terminal part D 43D and the bottom of an insertion slot 43D1, which is equipped at the top surface, is connected via the connection cable 2 (the connection cable 2 including the terminals at each end forming, at least in part, the first interface device). Herewith, the external connection terminal part A 13D of the mobile telephone unit 1 and the external connection terminal part D 43D can be connected by inserting the mobile telephone unit 1 into the insertion slot 43D1. And, as a result, map image, in the center of which its present location is there, is displayed on the external LCD touch panel 456 with a large enough size and resolution for a driver to confirm.

Also the external microphone 48A and the external speaker 48B are equipped around the chassis including the external LCD touch panel 456, which enables for a driver to make a hands-free telephone call and to be informed of traveling route information by voice.

Figure 10:
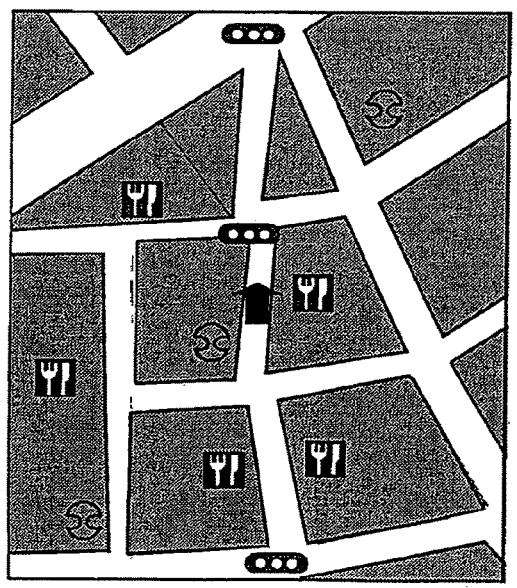
FIG. 10 is an image showing a screen image, which is displayed on a display panel belonging to the third embodiment of the present invention of a mobile information communication apparatus, when a map image including its present location information is displayed by the mobile information communication apparatus.
Figure 11:
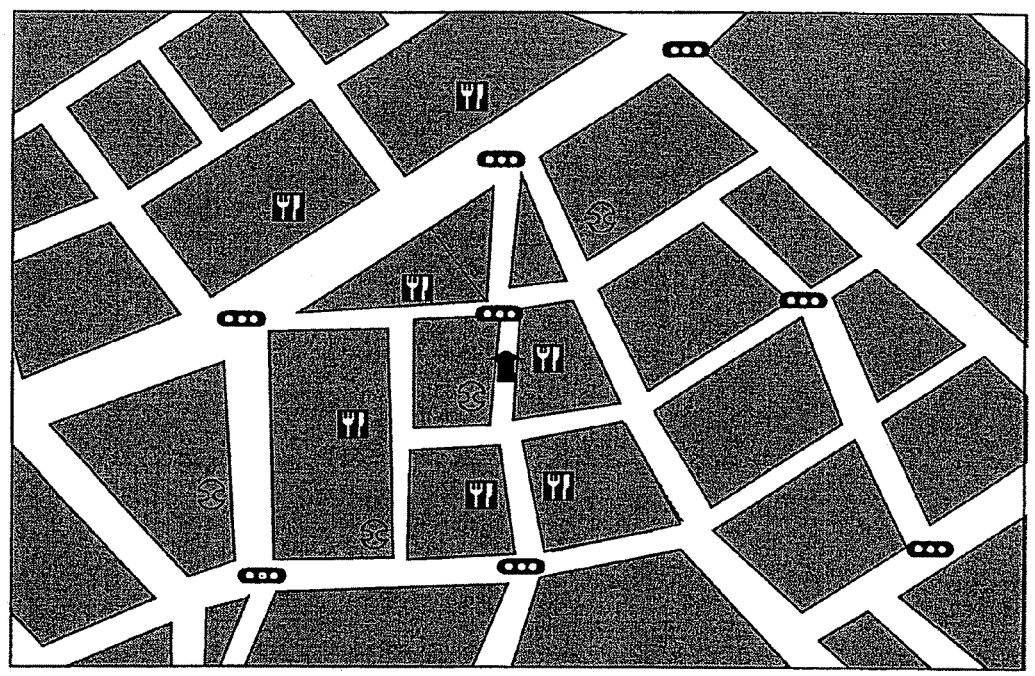
FIG. 11 is an image showing a screen image which is displayed on a screen of an external input/output unit, when a map image including its present location information is displayed by the third embodiment of the present invention of a navigation system which is composed by connecting a mobile information communication apparatus and an external input/output unit applied to a mobile information communication apparatus.

On the other hand, FIG. 10 is an image showing a screen image which is displayed on a display panel belonging to the third embodiment of the present invention of a mobile information communication apparatus, when a map image including its present location information is displayed by the mobile information communication apparatus, and FIG. 11 is an image showing a screen image which is displayed on a screen of an external input/output unit, when a map image including its present location information is displayed by the third embodiment of the present invention of a navigation system which is composed by connecting a mobile information communication apparatus and an external input/output unit applied to a mobile information communication apparatus.

As shown in the diagrams, in the case that a map image is displayed in an external display panel of the external input/output unit, which is connected to a mobile information communication apparatus so as to constitute this embodiment of the present invention of a navigation system, map information for wider area can be displayed than in the case that a mobile information communication apparatus is used by itself. This function is convenient in driving time when wide area must be surveyed and a car navigation system, which a driver himself can use, can be constituted cooperatively by this function and voice output of traveling route information.

Embodiment 4

Figure 12:
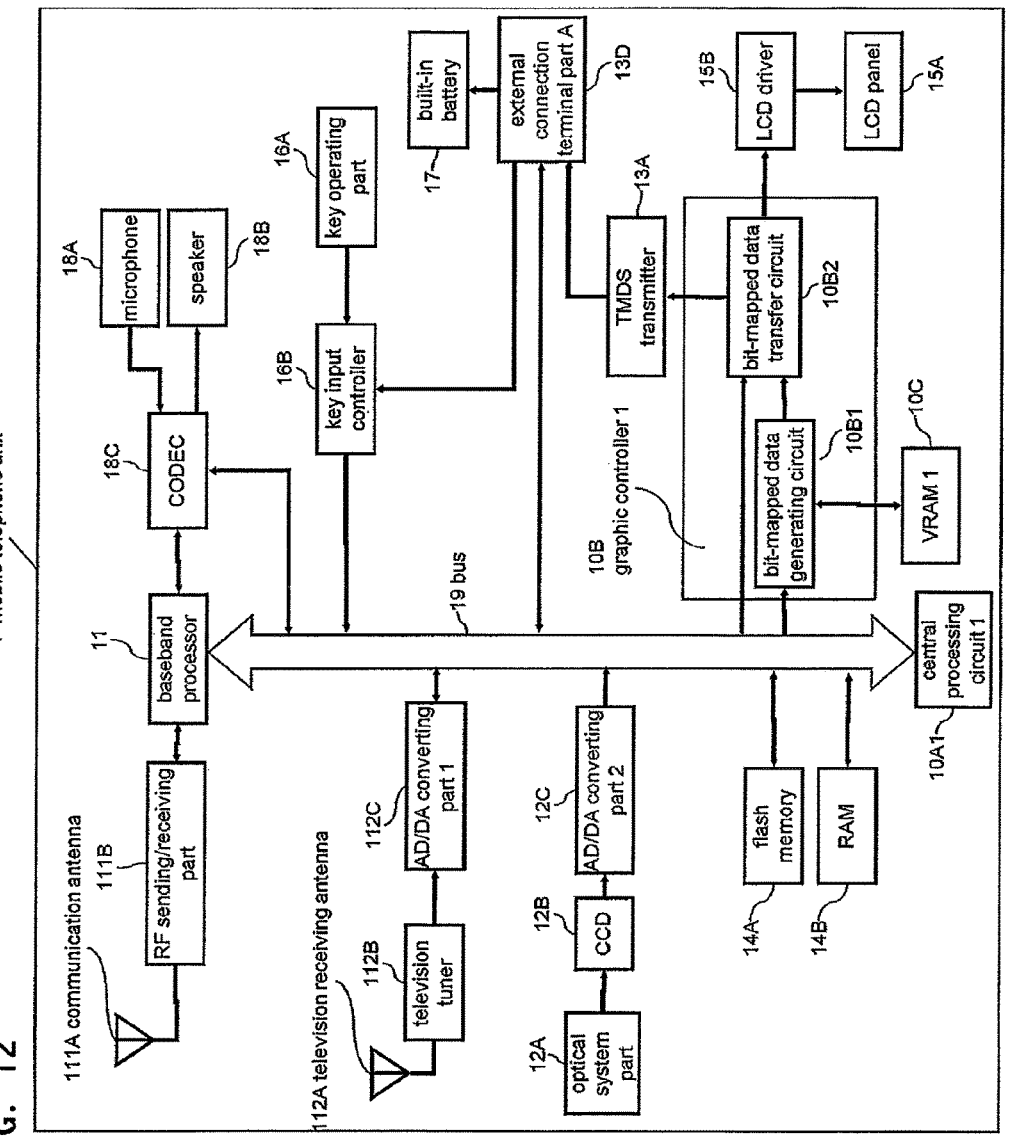
FIG. 12 is a block diagram showing a constitution and a function of the fourth embodiment of the present invention of a mobile information communication apparatus.

FIG. 12 is a block diagram showing a constitution and a function of the fourth embodiment of the present invention of a mobile information communication apparatus, especially in the case that the mobile information communication apparatus is a mobile telephone unit.

In this embodiment, the graphic controller 1_10B of the mobile telephone unit 1 is comprised of a bit-mapped data generating circuit 10B1 and a bit-mapped data transfer circuit 10B2. The bit-mapped data generating circuit 10B1 generates bit-mapped data according to a plotting command from the central processing circuit 1_10A1 and send the bit-mapped data to the bit-mapped data transfer circuit 10B2. The bit-mapped data transfer circuit 10B2 sends the bit-mapped data separately both to the TMDS transmitter 13A and the LCD driver 15B according to a sending command from the central processing circuit 1_10A1.

Embodiment 5

Figure 13:
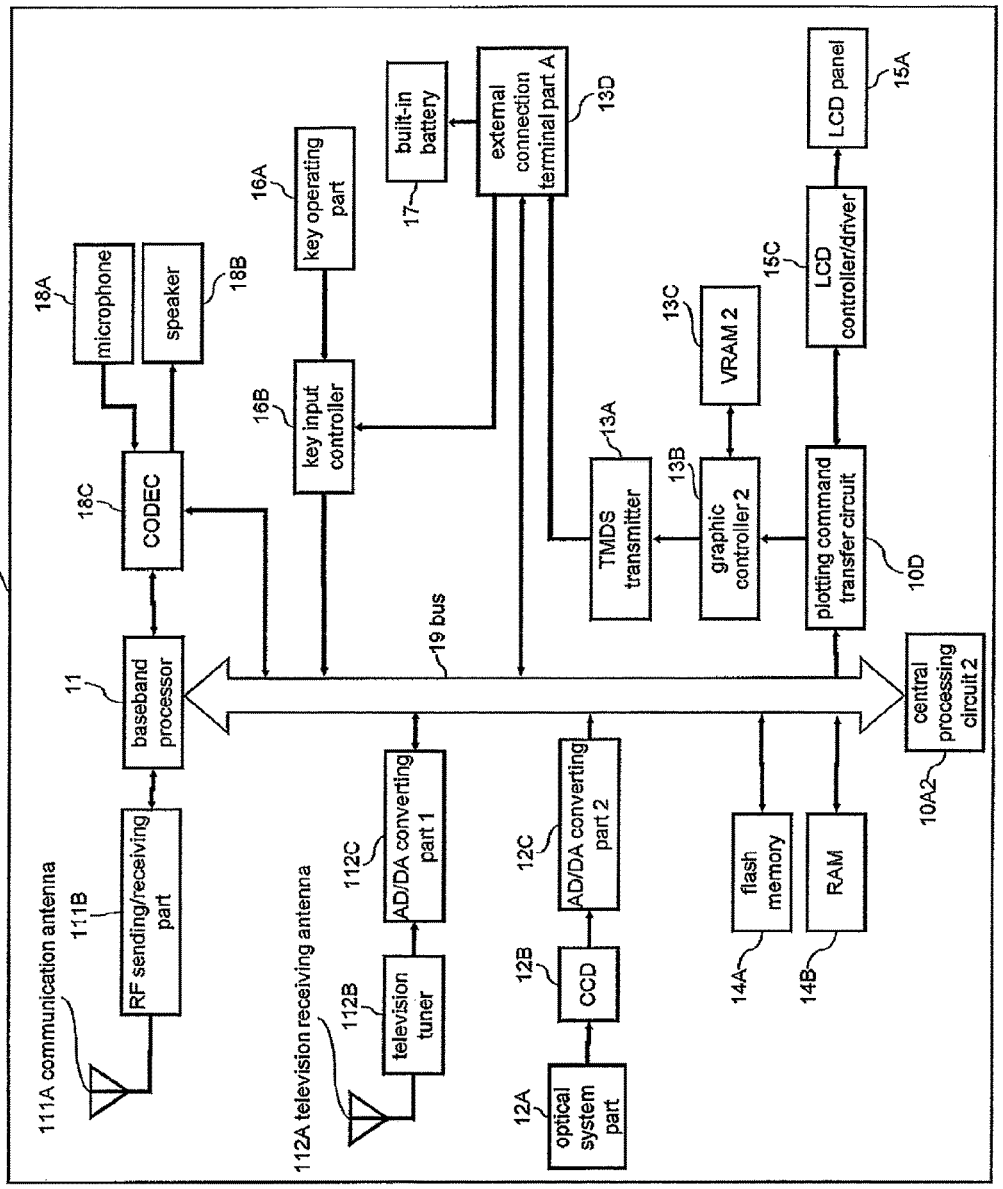
FIG. 13 is a block diagram showing a constitution and a function of the fifth embodiment of the present invention of a mobile information communication apparatus.

FIG. 13 is a block diagram showing a constitution and a function of the fifth embodiment of the present invention of a mobile information communication apparatus, especially in the case that the mobile information communication apparatus is a mobile telephone unit.

In this embodiment, the mobile telephone unit 1 is equipped with a central processing circuit 2_10A2 instead of the central processing circuit 1_10A1 in the first to the fourth embodiment and the central processing circuit 2_10A2 sends a plotting command a sending command to a plotting command transfer circuit 10D. The plotting command transfer circuit 10D sends the plotting command separately both to a graphic controller 2_13B and LCD controller/driver 15C according to the sending command.

The graphic controller 2_13B generates bit-mapped data, which describes an image displayed on an external display device, and stores the bit-mapped data temporarily in a VRAM 2_13C. And then, the graphic controller 2_13B cuts a portion of the bit-mapped data describing an image which is displayed on an external display device, and send the portion to the TMDS transmitter 13A.

On the other hand, LCD controller/driver 15C is equipped with graphic a controller circuit, a VRAM and a LCD driver circuit to form a chipset and displays an image by activating each pixel of a screen of the LCD panel 15A according to a plotting command received from the plotting command transfer circuit 10D.

Figure 14:
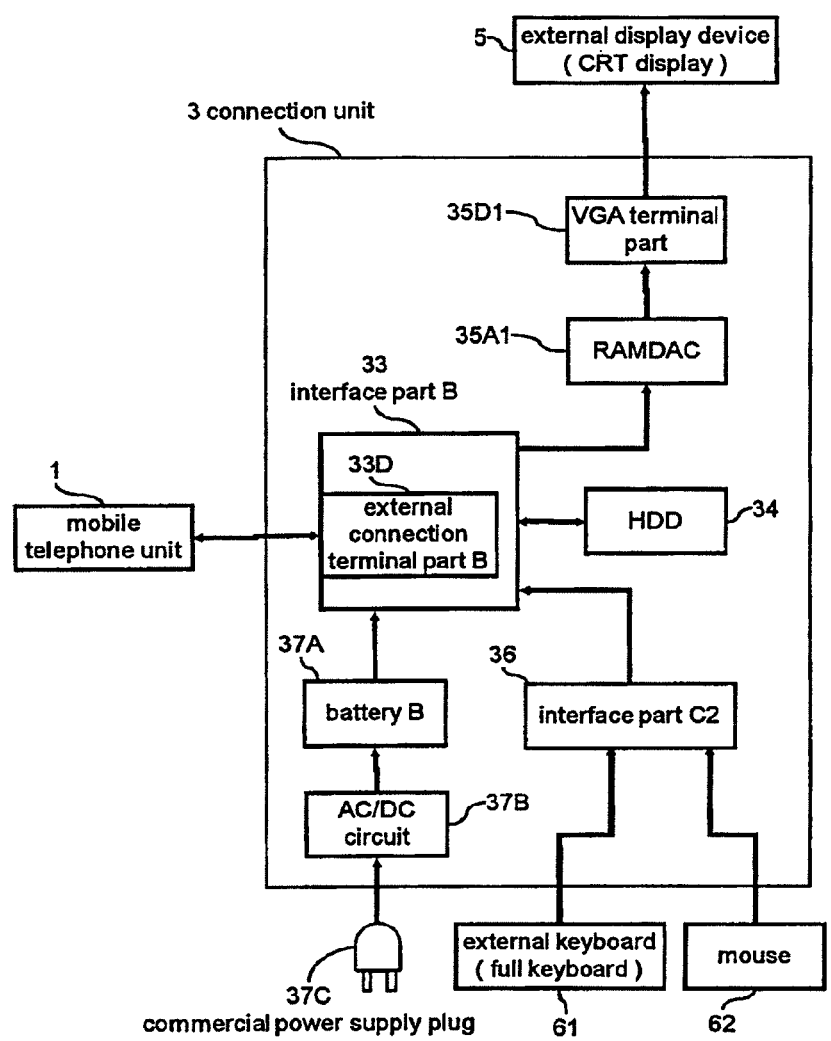
FIG. 14 is a block diagram showing a constitution and a function of the sixth embodiment of the present invention of a mobile information communication apparatus.

FIG. 14 is a block diagram showing a constitution and a function of the sixth embodiment of the present invention of a mobile information communication apparatus.

In this embodiment, an analog CRT display is connected to the connection unit 3 as an external display device. Therefore, a digital display signal, which is received by the interface part B 33, is converted to an analog signal in a RAMDAC (Random Access Memory Digital/Analog Converter) 35A1 and the analog signal is sent to the external display device 5 as an analog RGB signal from a VGA terminal part 35D1.

Figure 15:
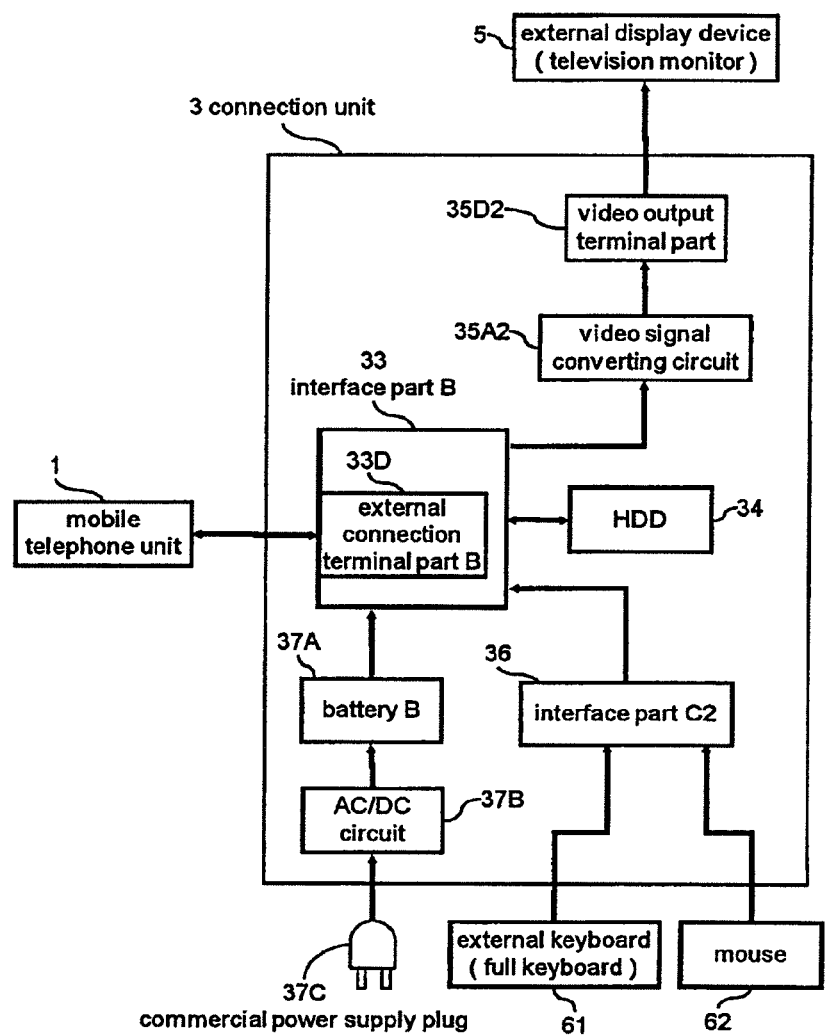
FIG. 15 is a block diagram showing a constitution and a function of the seventh embodiment of the present invention of a mobile information communication apparatus.

FIG. 15 is a block diagram showing a constitution and a function of the seventh embodiment of the present invention of a mobile information communication apparatus.

In this embodiment, an analog TV monitor is connected to the connection unit 3 as an external display device. Therefore, a digital display signal, which is received by the interface part B 33, is converted to an analog signal in a video signal converting circuit 35A2 and the analog signal is sent to the external display device 5 as composite video signal, separate video signal or component video signal from a video output terminal part 35D2. On this occasion, appropriate terminal corresponding to signal type (composite video terminal=RCA terminal, separate video terminal=S terminal, component video terminal) should be adopted as the video output terminal part 35D2.

It should be noted that signal conversion from digital to analog is not necessary (in some cases, however, signal conversion from digital to digital is necessary) and HDVI (High Definition Multimedia Interface) terminal is used as a connection terminal to an external display device.

INDUSTRIAL APPLICABILITY

The present invention is applicable to a variety of industries to manufacture and/or to utilize mobile information communication apparatuses including mobile telephone units. Also, it is applicable to industries to manufacture and/or to utilize non-mobile information communication apparatuses such as PC's and car navigation systems.

The invention claimed is:

1. A graphic controller installed in a mobile information communication apparatus comprising (i) a CPU, (ii) an interface means to send a display signal to a peripheral apparatus, and (iii) a display means including a display panel and a display control means, the graphic controller having the following functions:
a function to write and read bit-mapped data into/from a VRAM according to a processing result of the CPU;
a function to generate a first digital display signal and a second digital display signal for transmitting the read bit-mapped data, the first digital display signal and the second digital display signal having different intrinsic resolutions, the first digital display signal having a high intrinsic resolution, and the second digital display signal having a low intrinsic resolution; and
a function to send (i) the first digital display signal having the high intrinsic resolution to the interface means and (ii) the second digital display signal having the low intrinsic resolution to the display control means,
wherein the interface means converts the first digital display signal received from the graphic controller to a digital external display signal, and sends the digital external display signal to the peripheral apparatus, and
wherein the display control means activates each pixel of the display panel according to the second digital display signal received from the graphic controller.

2. A method performed by a graphic controller installed in a mobile information communication apparatus comprising (i) a CPU, (ii) an interface means to send a display signal to a peripheral apparatus, and (iii) a display means including a display panel and a display control means, the method comprising:
writing and reading bit-mapped data into/from a VRAM according to a processing result of the CPU;
generating a first digital display signal and a second digital display signal for transmitting the read bit-mapped data, the first digital display signal and the second digital display signal having different intrinsic resolutions, the first digital display signal having a high intrinsic resolution, and the second digital display signal having a low intrinsic resolution; and
sending the first digital display signal having the high intrinsic resolution to the interference means, and sending the second digital display signal having the low intrinsic resolution to the display control means,
wherein the interface means converts the first digital display signal received from the graphic controller to a digital external display signal, and sends the digital external display signal to the peripheral apparatus, and
wherein the display control means activates each pixel of the display panel according to the second digital display signal received from the graphic controller.

* * * * *